(12) United States Patent
Nakajima et al.

(10) Patent No.: US 8,587,723 B2
(45) Date of Patent: Nov. 19, 2013

(54) ELECTRONIC EQUIPMENT, CONTROL INFORMATION TRANSMISSION AND RECEPTION METHODS HAVING BIDIRECITONAL COMMUNICATION USING PREDETERMINED LINES

(75) Inventors: Yasuhisa Nakajima, Kanagawa (JP); Hidekazu Kikuchi, Kanagawa (JP); Takamichi Mitsuhashi, Tokyo (JP)

(73) Assignee: Sony Corporation (JP)

( * ) Notice: Subject to any disclaimer, the term of this patent is extended or adjusted under 35 U.S.C. 154(b) by 211 days.

(21) Appl. No.: 12/312,353

(22) PCT Filed: Nov. 7, 2007

(86) PCT No.: PCT/JP2007/071649
§ 371 (c)(1),
(2), (4) Date: Nov. 24, 2009

(87) PCT Pub. No.: WO2008/056707
PCT Pub. Date: May 15, 2008

(65) Prior Publication Data
US 2010/0066919 A1    Mar. 18, 2010

(30) Foreign Application Priority Data

Nov. 7, 2006   (JP) ............................... P2006-301486
Feb. 28, 2007  (JP) ............................... P2007-050426
Aug. 2, 2007   (JP) ............................... P2007-201517

(51) Int. Cl.
*H04N 11/00*  (2006.01)
*H04N 5/60*   (2006.01)
*H04N 7/26*   (2006.01)

(52) U.S. Cl.
USPC ............ 348/552; 348/738; 386/230; 386/231

(58) Field of Classification Search
USPC .......... 348/552, 470, 706, 738; 386/230, 231, 386/291; 725/133, 141, 153; 710/3, 5, 8, 710/10, 12, 14, 15, 18, 20, 31, 33, 62, 72, 710/312; 345/156; 381/81, 123
See application file for complete search history.

(56) References Cited

U.S. PATENT DOCUMENTS 6,336,219 B1 *  1/2002  Nathan ........................... 725/91
7,729,618 B2 *  6/2010  Tatum et al. ................... 398/139
(Continued)

FOREIGN PATENT DOCUMENTS

JP    62-75653 U    5/1987
JP    02-206249 A   8/1990
(Continued)

OTHER PUBLICATIONS

Supplementary European Search Report Application No. EP 07831380, dated May 25, 2010.
(Continued)

*Primary Examiner* — Victor Kostak
(74) *Attorney, Agent, or Firm* — Lerner, David, Littenberg, Krumholz & Mentlik, LLP

(57) ABSTRACT

Electronic equipment and methods for permitting quick control of the operating state of a source equipment side from sink equipment. A television receiver (sink equipment) 100 and an amplifier (repeater equipment) 200 are interconnected over an HDMI cable 610, and the amplifier 200 and a DVD recorder (source equipment) 300 are interconnected over an HDMI cable 620. Each of the pieces of equipment includes, in addition to an HDMI receiving unit and an HDMI transmitting unit, a high-speed data line I/F included in a bidirectional communication unit that uses predetermined lines of the HDMI cable. The bidirectional communication unit is used to transmit channel selection information, a remote control code instructing recording, "theater mode" designating information, a remote control code, or the like from the television receiver 100 to the audio amplifier 200 or DVD recorder 300.

10 Claims, 15 Drawing Sheets

(56) References Cited

U.S. PATENT DOCUMENTS

| | | | |
|---|---|---|---|
| 7,860,398 B2* | 12/2010 | Tatum et al. | 398/141 |
| 2005/0182876 A1 | 8/2005 | Kim et al. | |
| 2006/0036788 A1* | 2/2006 | Galang et al. | 710/65 |
| 2006/0056716 A1* | 3/2006 | Komeno | 382/233 |
| 2006/0095401 A1 | 5/2006 | Krikorian et al. | |
| 2006/0140221 A1 | 6/2006 | Yamada et al. | |
| 2006/0209880 A1* | 9/2006 | Chang et al. | 370/464 |
| 2007/0165997 A1 | 7/2007 | Suzuki et al. | |
| 2007/0220150 A1* | 9/2007 | Garg | 709/226 |
| 2008/0007616 A1* | 1/2008 | Baladhandayuthapani | 348/14.12 |
| 2008/0080596 A1 | 4/2008 | Inoue et al. | |
| 2008/0226258 A1* | 9/2008 | Shikata et al. | 386/83 |
| 2009/0046210 A1* | 2/2009 | Sakamoto et al. | 348/738 |
| 2009/0051824 A1* | 2/2009 | Satou | 348/734 |
| 2009/0269036 A1* | 10/2009 | Mitani et al. | 386/96 |
| 2010/0149433 A1* | 6/2010 | Jang et al. | 348/738 |
| 2010/0315553 A1* | 12/2010 | Takatsuji et al. | 348/516 |

FOREIGN PATENT DOCUMENTS

| | | | |
|---|---|---|---|
| JP | 11275684 A | 10/1999 | |
| JP | 2001057567 A | 2/2001 | |
| JP | 2001-320479 A | 11/2001 | |
| JP | 2003158724 A | 5/2003 | |
| JP | 2003-209775 A | 7/2003 | |
| JP | 2004254027 A | 9/2004 | |
| JP | 2004294437 A | 10/2004 | |
| JP | 2004356752 A | 12/2004 | |
| JP | 2005135433 A | 5/2005 | |
| JP | 2005143033 A | 6/2005 | |
| JP | 2006-107292 A | 4/2006 | |
| JP | 2006-140776 A | 6/2006 | |
| JP | 2006191161 A | 7/2006 | |
| JP | 2006203800 A | 8/2006 | |
| JP | 2006245949 A | 9/2006 | |
| JP | 2006-295822 A | 10/2006 | |
| JP | 2006-319503 A | 11/2006 | |
| JP | 2006-319573 A | 11/2006 | |
| JP | 04-245817 B2 | 4/2009 | |
| WO | WO-2005-064982 A1 | 7/2005 | |
| WO | WO-2006-057324 A1 | 6/2006 | |

OTHER PUBLICATIONS

Hitachi et al: "High—Definition Multimedia Interface Specification Version 1.1" Internet Citation May 20, 2004, page COMPLETE XP007909795 Retrieved from the Internet: URL:http://www.hdmi.org/download/HDMI_Specification_1.1.pdf> [retrieved on Sep. 16, 2009].

IEEE Standard for Information Technology Telecommunications, Supplement to Carrier Sense Multiple Access with Collision Detection (CSMA/CD)Access Method and Physical Layer Specifications. Physical Layer Parameters and Specifications for 1000 Mb/s Operation Over 4- Pair of Category 5. Balanced Copper Cabling, Type 1000 BASE-T.

Communication pursuant to Article 94 (3) EPC, from European Application No. 07831380.6-2202, dated Jun. 18, 2012.

Communication pursuant to Article 94 (3) EPC, from European Application No. 07831382.2-2202, dated Jun. 21, 2012.

Office Action from Japanese Application No. 2008-543113, dated Jul. 10, 2012.

"High—Definition Multimedia Interface Specification Version 1.3". Internet Citation, Jun. 22, 2006, XP002391813, Retrieved from the Internet: URL:http://www.hdmi.org/download/HDMI_Spec_1.3_GM1.pdf [retrieved on Jul. 24, 2006].

Office Action from Japanese Application No. 2008-543107, dated Mar. 19, 2013.

Office Action from Japanese Application No. 2008-543096, dated Nov. 22, 2012.

Office Action from Japanese Application No. 2008-543112, dated Nov. 27, 2012.

Office Action from Japanese Application No. 2008-543113, dated Jan. 8, 2013.

Office Action from Korean Application No. 10-2009-7006203, dated Sep. 12, 2013.

* cited by examiner

FIG. 8

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

ELECTRONIC EQUIPMENT, CONTROL INFORMATION TRANSMISSION AND RECEPTION METHODS HAVING BIDIRECITONAL COMMUNICATION USING PREDETERMINED LINES

CROSS-REFERENCES TO RELATED APPLICATIONS

The present application is a national phase entry under 35 U.S.C. §371 of International Application No. PCT/JP2007/071649 filed Nov. 7, 2007, published on May 15, 2008 as WO 2008/056707 A1, which claims priority from Japanese Patent Application No. JP 2006-301486 filed in the Japanese Patent Office on Nov. 7, 2006, Japanese Patent Application No. JP 2007-050426 filed in the Japanese Patent Office on Feb. 28, 2007, and Japanese Patent Application No. JP 2007-201517 filed in the Japanese Patent Office on Aug. 2, 2007.

TECHNICAL FIELD

The present invention relates to electronic equipment, a control information transmission method, and a control information reception method that employ a communication interface, for example, the high definition multimedia interface (HDMI). More particularly, the invention is concerned with electronic equipment that includes a communication unit which performs bidirectional communication using predetermined lines included in a transmission line, that uses the communication unit to transmit control information to another electronic equipment, and that thus can quickly control the operating state of the another electronic equipment. The invention is concerned with electronic equipment that includes a communication unit which performs bidirectional communication using predetermined lines included in a transmission line, that uses the communication unit to receive control information from another electronic equipment, that controls the operating state on the basis of the control information, and that thus permits quickly control of the operating state from the another electronic equipment side.

BACKGROUND ART

In recent years, the HDMI has prevailed as a communication interface under which a digital video signal, that is, a non-compressed (baseband) video signal (hereinafter, referred to as image data), and a digital audio signal accompanying the video signal (hereinafter, referred to as audio data) are transmitted from, for example, a digital versatile disc (DVD) recorder, a set-top box, or any another audiovisual (AV) source to a television receiver, a projector, or any another display (refer to, for example, a patent document 1).

Between pieces of equipment interconnected under the HDMI, control is implemented under the consumer electronics control (CEC) standard stipulated in the HDMI. However, the CEC standard succeeds a data structure and a transmission speed defined for equipment control through a SCART (syndicat des constructeurs d'appareils radiorecepteurs et televiseurs) terminal in an analog mode. Therefore the transmission speed for control information is as low as approximately 400 bps, and the data structure is defined to basically support transmission in units of 16 bytes. The transmission speed and data structure are therefore unsuitable for control that requires a high-speed response or transmission of control information whose length exceeds 16 bytes.

In a patent document 2, a proposal is made of a technology in which when a received partial transport stream (TS) is outputted from a transmission unit to another video equipment or device, message information alone is separated and extracted, converted into a universal plug and play (UPnP) representation, and then outputted from the transmission unit. In a patent document 3, a proposal is made of equipment in which: data and control information are transferred between a receiving device and a recording device; and the receiving device side includes a processing means which deals with recording control.

Patent document 1: JP-A-2006-319503
Patent document 2: JP-A-2006-319573
Patent document 3: JP-A-2003-209775

DISCLOSURE OF THE INVENTION

Problem to be Solved by the Invention

The technology described in the patent document 2 is not concerned with control between pieces of equipment. The technology described in the patent document 3 is concerned with control between pieces of equipment but is not concerned with control between pieces of equipment interconnected under the HDMI.

An object of the invention is to permit quick control of the operating state of a source equipment side from sink equipment.

Means for Solving the Problem

The concept of the invention lies in electronic equipment that includes a signal receiving unit which receives a video signal sent from another electronic equipment over a transmission line by means of differential signals on multiple channels.

The electronic equipment is characterized in that: the electronic equipment further includes a communication unit which performs bidirectional communication using predetermined lines included in the transmission line; and the communication unit transmits control information, which is used to control at least the operating state of the another electronic equipment side, to the another electronic equipment.

The electronic equipment of the invention includes the signal receiving unit that receives a video signal sent from another electronic equipment over a transmission line by means of differential signals on multiple channels, and is, for example, HDMI-conformable sink equipment or repeater equipment. In the invention, the communication unit that performs bidirectional communication using the predetermined lines included in the transmission line is further included. The communication unit is used to transmit control information to another electronic equipment. In this case, the control information can be quickly sent to another electronic equipment, and the operating state of the another electronic equipment side can be quickly controlled.

In the invention, for example, a broadcast receiving unit that acquires a video signal on a predetermined channel on the basis of a television broadcast signal, a display unit that displays a picture represented by the video signal acquired by the broadcast receiving unit, and a user operating unit which a user uses to instruct recording of the video signal relevant to the picture displayed on the display unit may be further included. The communication unit may transmit not only information on channel selection in the broadcast receiving unit but also information on recording instruction made using the user operating unit. In this case, the channel selected in the broadcast receiving unit existing on the another electronic equipment side can be switched to a channel relevant to the picture displayed on the display unit. When user's recording instruction is made, a recording unit on the another electronic equipment side can immediately initiate recording of a video signal relevant to the picture displayed on the display unit.

In the invention, for example, a broadcast receiving unit that acquires a video signal and an audio signal on the basis of a television broadcast signal, a display unit that displays a picture represented by the video signal acquired by the broadcast receiving unit, a loudspeaker that outputs sounds represented by the audio signal acquired by the broadcast receiving unit, and a user operating unit which a user uses to designate an external audio output mode in which the sounds represented by the audio signal acquired by the broadcast receiving unit are outputted through the external loudspeaker may be further included. The communication unit may feed the audio signal acquired by the broadcast receiving unit to the another electronic equipment, and may transmit the designating information on the external output mode entered using the user operating unit. In this case, the audio signal acquired by the broadcast receiving unit can be sent to the another electronic equipment side. The sounds represented by the audio signal acquired by the broadcast receiving unit can be outputted through the external loudspeaker according to the user's designation of the external audio output mode.

In the invention, for example, a remote control signal receiving unit that receives a remote control signal (remote control code) sent from a transmitter of the remote control signal may be further included. The communication unit may transmit the remote control signal received by the remote control signal receiving unit to another electronic equipment. In this case, when a user remotely controls the another electronic equipment side, the communication unit can send a remote control signal deriving from the remote control to the another electronic equipment side. The operating state of the another electronic equipment side can be quickly controlled.

The concept of the invention lies in electronic equipment that includes a signal transmitting unit which transmits a video signal to another electronic equipment over a transmission line by means of differential signals on multiple channels, and that further includes:

a communication unit that performs bidirectional communication using predetermined lines included in the transmission line; and a control unit that controls the operating state on the basis of control information received by the communication unit.

The electronic equipment of the invention includes the signal transmitting unit that transmits a video signal to another electronic equipment over a transmission line by means of differential signals on multiple channels, and is, for example, HDMI-conformable source equipment or repeater equipment. In the invention, the communication unit that performs bidirectional communication using predetermined lines included in the transmission line is included. The control unit controls the operating state on the basis of the control information received by the communication unit. In this case, the control information can be quickly received from the another electronic equipment, and quick control of the operating state from the another electronic equipment side is permitted.

In the invention, for example, a broadcast receiving unit that acquires a video signal on a predetermined channel on the basis of a television broadcast signal, and a recording unit that records the video signal acquired by the broadcast receiving unit may be included. The control unit may control a channel, which is selected by the broadcast receiving unit, on the basis of information on channel selection received by the communication unit, and may also control the recording unit on the basis of the information on recording instruction, which is received by the communication unit, so that the recording unit will initiate recording of the video signal acquired by the broadcast receiving unit. In this case, the channel selected by the broadcast receiving unit can be switched to the channel relevant to the picture displayed on the display unit existing on the another electronic equipment side. When user's recording instruction is made on the another electronic equipment side, the recording unit can immediately initiate recording of the video signal representing the picture displayed on the display unit on the another electronic equipment side.

In the invention, for example, an audio output unit that outputs an audio signal received by the communication unit to the loudspeaker may be further included. The control unit may control the audio output unit on the basis of the designating information on the external audio output mode, which is received by the communication unit, so that muting in the audio output unit will be changed from an on state to an off state. In this case, the audio signal acquired by the broadcast receiving unit on the another electronic equipment side can be received. When the user's designating information on the external audio output mode is fed from the another electronic equipment side, muting in the audio output unit is changed from the on state to the off state. Control can be immediately implemented in order to attain a state in which sounds represented by the audio signal acquired by the broadcast receiving unit on the another electronic equipment side can be outputted through the external loudspeaker.

In the invention, for example, the control unit may control the actions of the respective units on the basis of a remote control signal received by the communication unit. In this case, the remote control signal is transmitted from another electronic equipment side, and the actions of the respective units can be quickly controlled.

Advantage of the Invention

According to the invention, a communication unit that performs bidirectional communication using predetermined lines included in a transmission line is included. The communication unit is used to transmit control information to another electronic equipment. The operating state of the another electronic equipment can be quickly controlled. According to the invention, a communication unit that performs bidirectional communication using predetermined lines included in a transmission line is included. The communication unit is used to receive control information from another electronic equipment. An operating state is controlled based on the control information. The operating state can be quickly controlled from the another electronic equipment side.

BRIEF DESCRIPTION OF THE DRAWINGS

FIG. 8 is a diagram showing the pin assignment (type A) of an HDMI terminal;

DESCRIPTION OF REFERENCE NUMERALS

10: communication system, 100: television receiver, 101: HDMI terminal, 102: HDMI receiving unit, 103: high-speed data line interface, 200: audio amplifier, 201a, 201b: HDMI terminal, 202a: HDMI transmitting unit, 202b: HDMI receiving unit, 203a, 203b: high-speed data line interface, 300: DVD recorder, 301: HDMI terminal, 302: HDMI transmitting unit, 303: high-speed data line interface, 400: receiving antenna, 500: 5.1-channel loudspeaker group, 610, 620: HDMI cable.

BEST MODE FOR CARRYING OUT THE INVENTION

Figure 1:
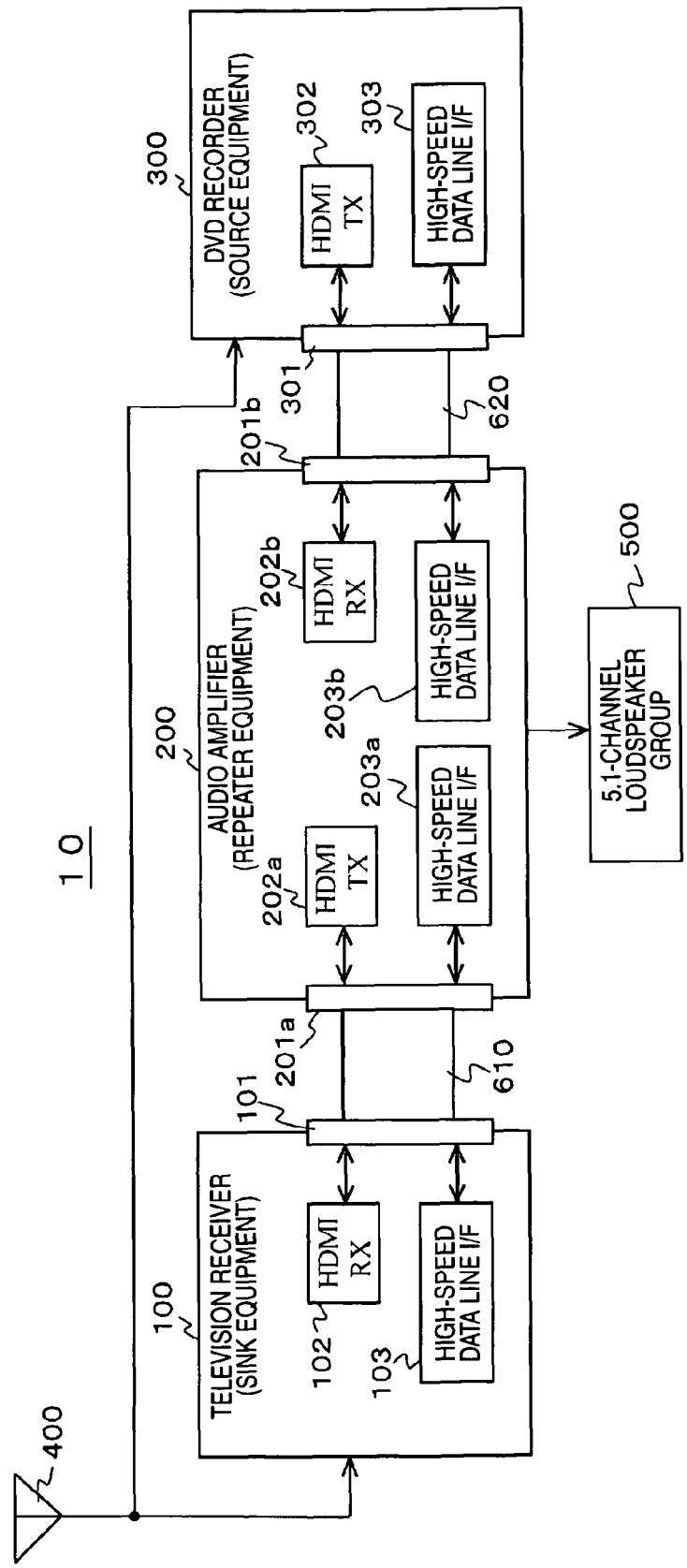
FIG. 1 is a block diagram showing as an embodiment an example of the configuration of a communication system employing the HDMI.

Referring to the drawings, an embodiment of the invention will be described below. FIG. 1 shows an example of the configuration of a communication system 10 as an embodiment. The communication system 10 includes a television receiver 100 serving as sink equipment, an audio amplifier 200 serving as repeater equipment, and a DVD recorder 300 serving as source equipment. To the television receiver 100 and DVD recorder 300, a television broadcast receiving antenna 400 is connected. To the audio amplifier 200, a 5.1-channel loudspeaker group 500 is connected.

The television receiver 100 and audio amplifier 200 are interconnected over an HDMI cable 610. The television receiver 100 is provided with an HDMI terminal 101 to which an HDMI receiving unit (HDMIRX) 102 and a high-speed data line interface (I/F) 103 included in a communication unit are connected. The audio amplifier 200 is provided with an HDMI terminal 201a to which an HDMI transmitting unit (HDMITX) 202a and a high-speed data line interface (I/F) 203a included in a communication unit are connected. One end of the HDMI cable 610 is coupled to the HDMI terminal 101 of the television receiver 100, and the other end of the HDMI cable 610 is coupled to the HDMI terminal 201a of the audio amplifier 200.

The audio amplifier 200 and DVD recorder 300 are interconnected over a HDMI cable 620. The audio amplifier 200 is provided with an HDMI terminal 201b to which an HDMI receiving unit (HDMIRX) 202b and a high-speed data line interface (I/F) 203b included in a communication unit are connected. The DVD recorder 300 is provided with an HDMI terminal 301 to which an HDMI transmitting unit (HDMITX) 302 and a high-speed data line interface (I/F) 303 included in a communication unit are connected. One end of the HDMI cable 620 is coupled to the HDMI terminal 201b of the audio amplifier 200, and the other end of the HDMI cable 620 is coupled to the HDMI terminal 301 of the DVD recorder 300.

Figure 2:
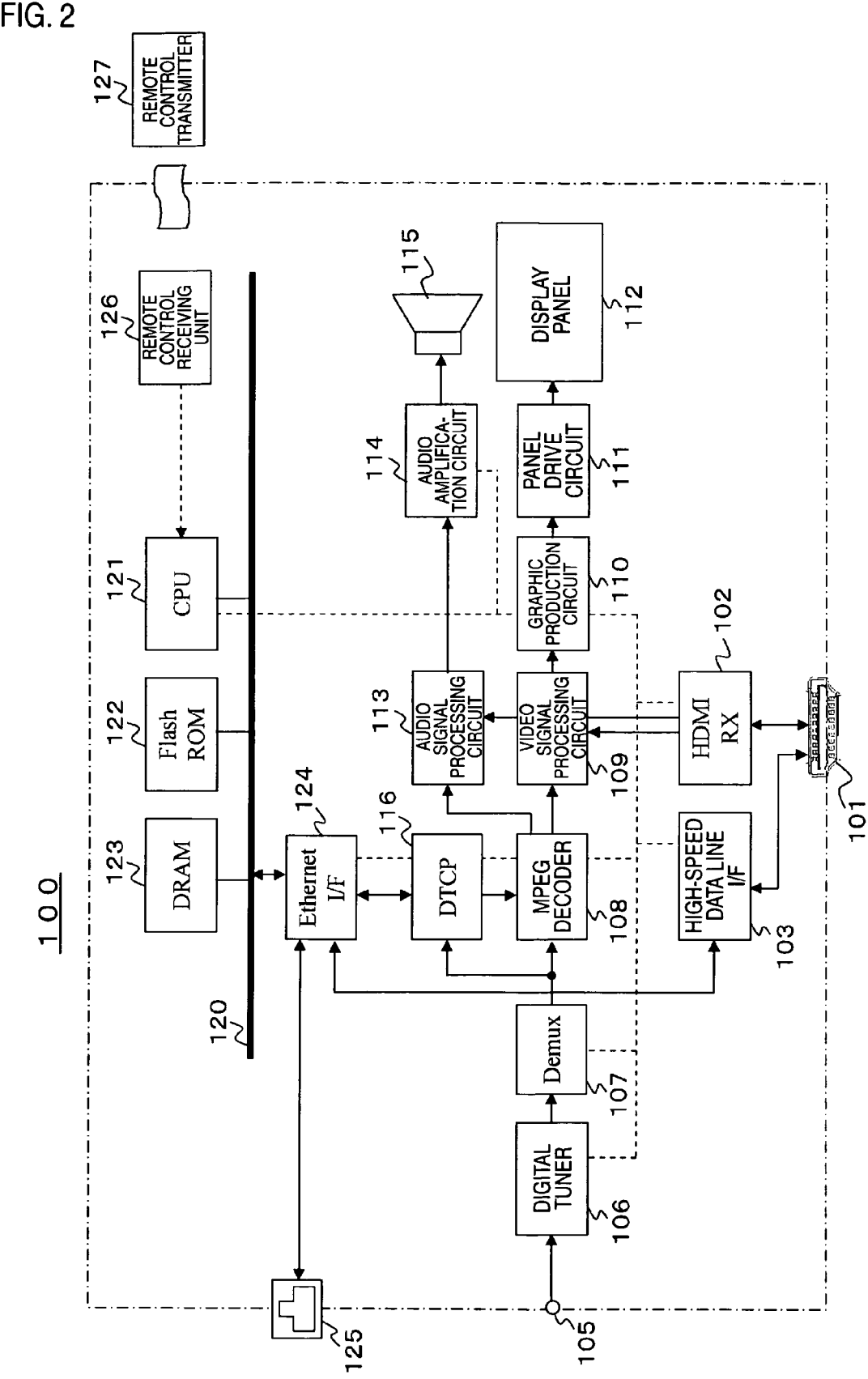
FIG. 2 is a block diagram showing an example of the configuration of a television receiver serving as sink equipment.

FIG. 2 shows an example of the configuration of the television receiver 100. The television receiver 100 includes the HDMI terminal 101, the HDMI receiving unit 102, the high-speed data line interface 103, an antenna terminal 105, a digital tuner 106, a demultiplexer 107, a moving picture expert group (MPEG) decoder 108, a video signal processing circuit 109, a graphic production circuit 110, a panel drive circuit 111, a display panel 112, an audio signal processing circuit 113, an audio amplification circuit 114, a loudspeaker 115, a digital transmission content protection (DTCP) circuit 116, an internal bus 120, a central processing unit (CPU) 121, a flash read-only memory (ROM) 122, a dynamic random access memory (DRAM) 123, an Ethernet interface (I/F) 124, a network terminal 125, a remote control receiving unit 126, and a remote control transmitter 127.

Noted is that "Ethernet" is a registered trademark. The digital tuner 106 and demultiplexer 107 constitute a broadcast receiving unit. The remote control receiving unit 126 and remote control transmitter 127 constitute a user operating unit.

The antenna terminal 105 is a terminal that inputs a television broadcast signal received by the receiving antenna 400. The digital tuner 106 processes the television broadcast signal inputted to the antenna terminal 105, and outputs a predetermined transport stream associated with a user-selected channel. The demultiplexer 107 extracts a partial transport steam (TS) (a TS packet of video data and a TS packet of audio data) from the transport stream obtained by the digital tuner 106.

The demultiplexer 107 fetches a program-specific information/service information (PSI/SI) from the transport stream obtained by the digital tuner 106, and outputs the PSI/SI to the CPU 121. The transport stream obtained by the digital tuner 106 has multiple channels multiplexed therein. The processing in which the demultiplexer 107 extracts the partial TS on an arbitrary channel from the transport stream is enabled by obtaining information concerning a packet ID (PID) on the arbitrary channel from the PSI/SI (PAT/PMT).

The MPEG decoder 108 performs decoding processing on a video packetized elementary stream (PES) packet formed with a TS packet of video data obtained by the demultiplexer 107 so as to provide video data. The MPEG decoder 108 performs decoding processing on an audio PES packet formed with a TS packet of audio data obtained by the demultiplexer 107 so as to provide audio data. The MPEG decoder 108 performs decoding processing on the PES packets of a picture and sounds respectively, which are decrypted by the DTCP circuit 116, so as to provide video data and audio data.

The video signal processing circuit 109 and graphic production circuit 110 perform, if necessary, multi-screen processing, graphic data superposing processing, or the like on video data obtained by the MPEG decoder 108. The panel drive circuit 111 drives the display panel 112 on the basis of the video data outputted from the graphic production circuit 110. The display panel 112 is formed with, for example, a liquid crystal display (LCD), a plasma display panel (PDP), or the like. The audio signal processing circuit 113 performs required processing such as D/A conversion on the audio data obtained by the MPEG decoder 108. The audio amplification circuit 114 amplifies an audio signal outputted from the audio signal processing circuit 113, and feeds the resultant signal to the loudspeaker 115.

The DTCP circuit 116 encrypts, if necessary, a partial TS extracted by the demultiplexer 107. The DTCP circuit 116 decrypts encrypted data fed from the network terminal 125 or high-speed data line interface 103 to the Ethernet interface 124.

The CPU 121 controls the actions of the components of the television receiver 100. The flash ROM 122 stores control software and preserves data. The DRAM 123 forms a work area for the CPU 121. The CPU 121 develops software or data, which is read from the flash ROM 122, in the DRAM 123, activates the software, and controls the components of the television receiver 100. The remote control receiving unit 126 receives a remote control signal (remote control code) transmitted from the remote control transmitter 127, and feeds the signal to the CPU 121. The CPU 121, flash ROM 122, DRAM 123, and Ethernet interface 124 are interconnected over the internal bus 120.

The HDMI receiving unit (HDMI sink) 102 receives video (image) data and audio data of the baseband fed to the HDMI terminal 101 over the HDMI cable 610 through the communication in accordance with the HDMI. The HDMI receiving unit 102 will be detailed later. The high-speed data line interface 103 is a bidirectional communication interface employing predetermined lines (in this embodiment, a reserved line and an HPD line) included in the HDMI cable 610. The high-speed data line interface 103 will be detailed later.

The actions in the television receiver 100 shown in FIG. 2 will be briefly described below.

A television broadcast signal inputted to the antenna terminal 105 is fed to the digital tuner 106. The digital tuner 106 processes the television broadcast signal, and outputs a predetermined transport stream associated with a user-selected channel. The predetermined transport stream is fed to the demultiplexer 107. The demultiplexer 107 extracts a partial TS (a TS packet of video data and a TS packet of audio data) associated with the user-selected channel from the transport stream. The partial TS is fed to the MPEG decoder 108.

The MPEG decoder 108 performs decoding processing on a video PES packet formed with the TS packet of video data, and provides the video data. The video data is subjected to, if necessary, multi-screen processing, graphic data superposing processing, or the like by the video signal processing circuit 109 and graphic production circuit 110. Thereafter, the resultant video data is fed to the panel drive circuit 111. An image associated with the user-selected channel is displayed on the display panel 112.

The MPEG decoder 108 performs decoding processing on an audio PES packet formed with the TS packet of audio data, and provides the audio data. The audio data is subjected to required processing such as D/A conversion by the audio signal processing circuit 113. After amplified by the audio amplification circuit 114, the resultant audio data is fed to the loudspeaker 115. Sounds associated with the user-selected channel are outputted through the loudspeaker 115.

When the television broadcast signal is received, a partial TS extracted by the demultiplexer 107 is encrypted by the DTCP circuit 116, and fed as transmitted data to the high-speed data line interface 103 via the Ethernet interface 124.

Therefore, the partial TS is transmitted to the audio amplifier 200 over the predetermined lines of the HDMI cable 610 coupled to the HDMI terminal 101.

When the television broadcast signal is received, if the partial TS extracted by the demultiplexer 107 is transmitted over a network, after the partial TS is encrypted by the DTCP circuit 116, the resultant partial TS is outputted to the network terminal 125 via the Ethernet interface 124.

The remote control receiving unit 126 receives a remote control code (remote control signal) sent from the remote control transmitter 127. The remote control code is fed to the CPU 121. If the remote control code relates to control of the television receiver 100, the CPU 121 controls the components of the television receiver 100 on the basis of the remote control code.

The CPU 121 produces an IP packet containing the remote control code fed from the remote control receiving unit 126. The IP packet is outputted to the HDMI terminal 101 via the Ethernet interface 124 and high-speed data line interface 103. The IP packet is transmitted to the audio amplifier 200 side over the HDMI cable 610 coupled to the HDMI terminal 101. The IP packet is, if necessary, transmitted over a network. In this case, the IP packet is outputted to the network terminal 125 via the Ethernet interface 124.

Figure 3:
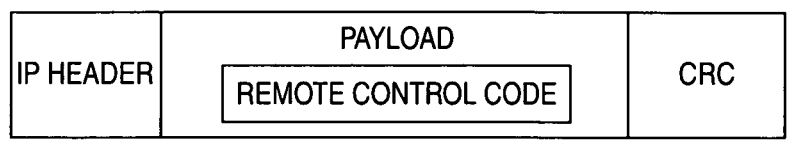
FIG. 3 is a diagram showing the construction of an IP packet to be used to transmit a remote control code.

FIG. 3 shows the construction of an IP packet containing a remote control code. The IP packet is composed of an IP header, a payload, and a CRC. In the IP packet containing the remote control code, the remote control code is inserted into the payload division.

After an encrypted partial TS that is fed from the network terminal 125 to the Ethernet interface 124 or fed from the HDMI terminal 101 to the Ethernet interface 124 via the high-speed data line interface 103 is decrypted by the DTCP circuit 116, the decrypted partial TS is fed to the MPEG decoder 108. Thereafter, the same actions as those performed when a television broadcast signal is received are carried out. An image is displayed on the display panel 112, and sounds are outputted through the loudspeaker 115.

The HDMI receiving unit 102 acquires video (image) data and audio data that are transmitted from the audio amplifier 200 side connected to the HDMI terminal 101 over the HDMI cable 610. The video data and audio data are fed to the video signal processing circuit 109 and audio signal processing circuit 113 respectively. Thereafter, the same actions as those performed when a television broadcast signal is received are carried out. An image is displayed on the display panel 112, and sounds are outputted through the loudspeaker 115.

Figure 4:
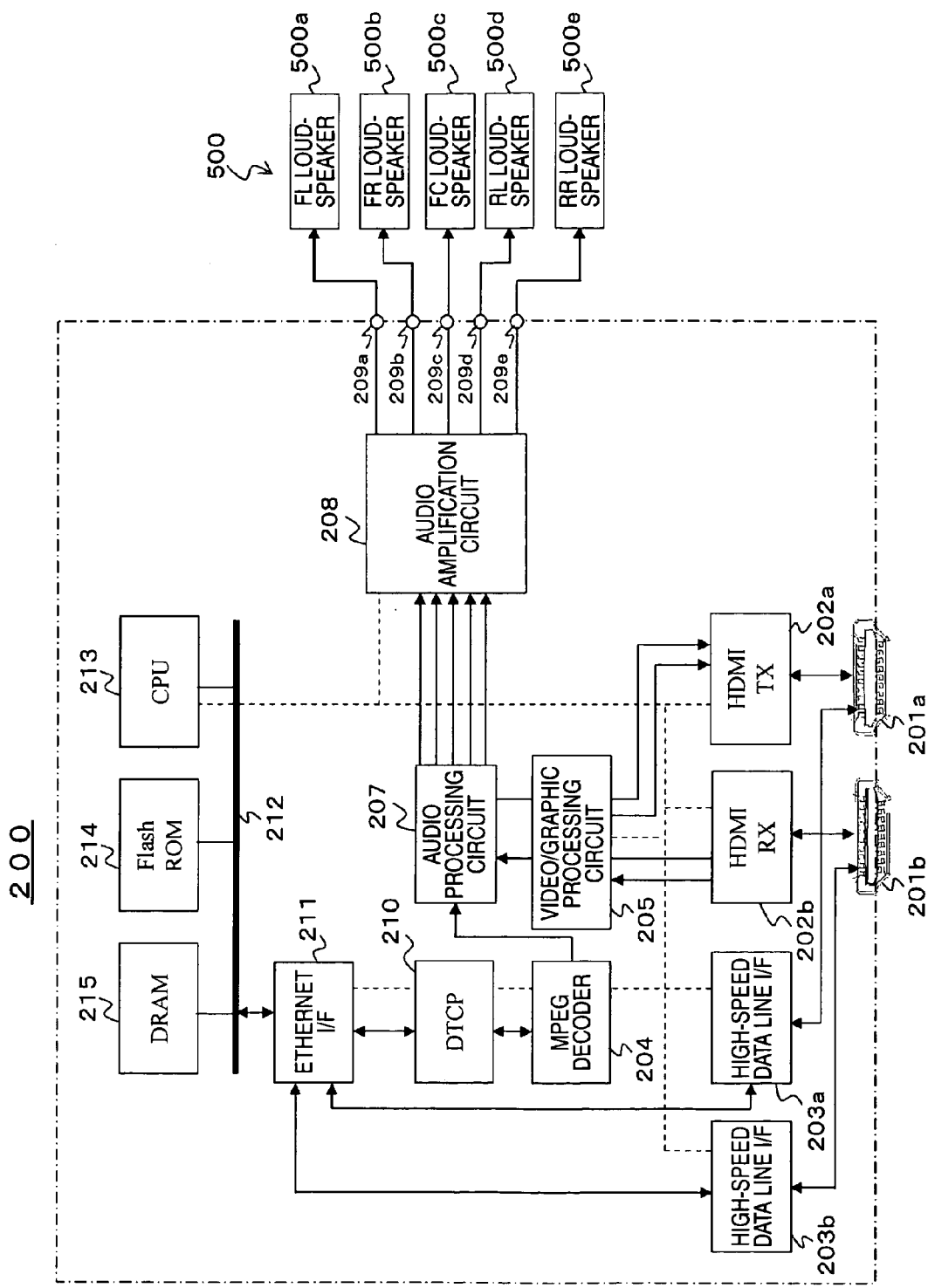
FIG. 4 is a block diagram showing an example of the configuration of an audio amplifier serving as repeater equipment.

FIG. 4 shows an example of the configuration of the audio amplifier 200. The audio amplifier 200 includes the HDMI terminals 201a and 201b, the HDMI transmitting unit 202a, the HDMI receiving unit 202b, the high-speed data line interfaces 203a and 203b, an MPEG decoder 204, a video/graphic processing circuit 205, an audio processing circuit 207, an audio amplification circuit 208, audio output terminals 209a to 209e, a DTCP circuit 210, an Ethernet interface 211, an internal bus 212, a CPU 213, a flash ROM 214, and a DRAM 215.

The HDMI transmitting unit (HDMI source) 202a transmits video (image) data and audio data of the baseband from the HDMI terminal 201a over the HDMI cable 610 through communication conformable to the HDMI. The HDMI receiving unit (HDMI sink) 202b receives video (image) data and audio data of the baseband fed to the HDMI terminal 201b over the HDMI cable 620 through communication conformable to the HDMI. The HDMI transmitting unit 202a and HDMI receiving unit 202b will be detailed later.

The high-speed data line interface 203a is a bidirectional communication interface using predetermined lines (in the present embodiment, a reserved line and an HPD line) included in the HDMI cable 610. The high-speed data line interface 203b is a bidirectional communication interface using predetermined lines (in the present embodiment, a reserved line and an HPD line) included in the HDMI cable 620. The high-speed data line interfaces 203a and 203b will be detailed later.

The DTCP circuit 210 decrypts an encrypted partial TS that is fed to the Ethernet interface 211 via the high-speed data line interface 203b. The MPEG decoder 204 performs decoding processing on an audio PES packet out of the partial TS decrypted by the DTCP circuit 210, and thus provides audio data.

The audio processing circuit 207 performs required processing such as D/A conversion on the audio data obtained by the MPEG decoder 204. The audio amplification circuit 208 amplifies a front left audio signal SFL, a front right audio signal SFR, a front center audio signal SFC, a rear left audio signal SRL, and a rear right audio signal SRR, and outputs the resultant signals to the audio output terminals 209a, 209b, 209c, 209d, and 209e respectively.

A front left loudspeaker 500a, a front right loudspeaker 500b, a front center loudspeaker 500c, a rear left loudspeaker 500d, and a rear right loudspeaker 500e constituting the loudspeaker group 500 are connected to the audio output terminals 209a, 209b, 209c, 209d, and 209e respectively.

The audio processing circuit 207 performs required processing on the audio data obtained by the HDMI receiving unit 202b, and then feeds the resultant audio data to the HDMI transmitting unit 202a. The video/graphic processing circuit 205 performs processing such as graphic data superposition on the video (image) data obtained by the HDMI receiving unit 202b, and then feeds the resultant data to the HDMI transmitting unit 202a.

The CPU 213 controls the actions of the components of the audio amplifier 200. The flash ROM 204 stores control software and preserves data. The DRAM 215 forms a work area for the CPU 213. The CPU 213 develops software and data, which are read from the flash ROM 214, in the DRAM 215, activates the software, and controls the components of the audio amplifier 200. The CPU 213, flash ROM 214, DRAM 215, and Ethernet interface 211 are interconnected over the internal bus 212.

The actions in the audio amplifier 200 shown in FIG. 4 will be briefly described below.

In the HDMI receiving unit 202b, video (image) data and audio data sent from the DVD recorder 300 connected to the HDMI terminal 201b over the HDMI cable 620 are acquired. The video data and audio data are fed to the HDMI transmitting unit 202a via the video/graphic processing circuit 205 and audio processing circuit 207 respectively, and transmitted to the television receiver 100 over the HDMI cable 610 coupled to the HDMI terminal 201a.

In the high-speed line interface 203a, an encrypted partial TS transmitted from the television receiver 100 over predetermined lines of the HDMI cable 610 coupled to the HDMI terminal 201a is received. The partial TS is fed to the DTCP circuit 210 via the Ethernet interface 211, and decrypted thereby.

The partial TS decrypted by the DTCP circuit 210 is fed to the MPEG decoder 204. In the MPEG decoder 204, decoding processing is performed on a PES packet of audio data included in the partial TS in order to provide the audio data. The audio data is fed to the audio processing circuit 207 and subjected to required processing such as D/A conversion.

When muting is set to an off state, various audio signals SFL, SFR, SFC, SRL, and SRR outputted from the audio processing circuit 207 are amplified and outputted to the audio output terminals 209a, 209b, 209c, 209d, and 209e respectively. Sounds are outputted through the loudspeaker group 500.

In the high-speed data line interface 203a, an IP packet containing a remote control code and being transmitted from the television receiver 100 over predetermined lines of the HDMI cable 610 coupled to the HDMI terminal 201a is received. The IP packet is fed to the CPU 213 via the Ethernet interface 211. When the remote control code contained in the IP packet relates to control of the audio amplifier 200, the CPU 213 controls the components of the audio amplifier 200 on the basis of the remote control code. For example, when the remote control code represents a designation of a "theater mode" as an external audio output mode, the CPU 213 controls muting of the audio amplification circuit 208 so that the muting will be changed from the on state to an off state.

The partial TS and IP packet received as mentioned above by the high-speed data line interface 203a and fed to the Ethernet interface 211 are fed as transmitted data to the high-speed data line interface 203b. The partial TS and IP packet are transmitted to the DVD recorder 300 over predetermined lines of the HDMI cable 620 coupled to the HDMI terminal 201b.

Figure 5:
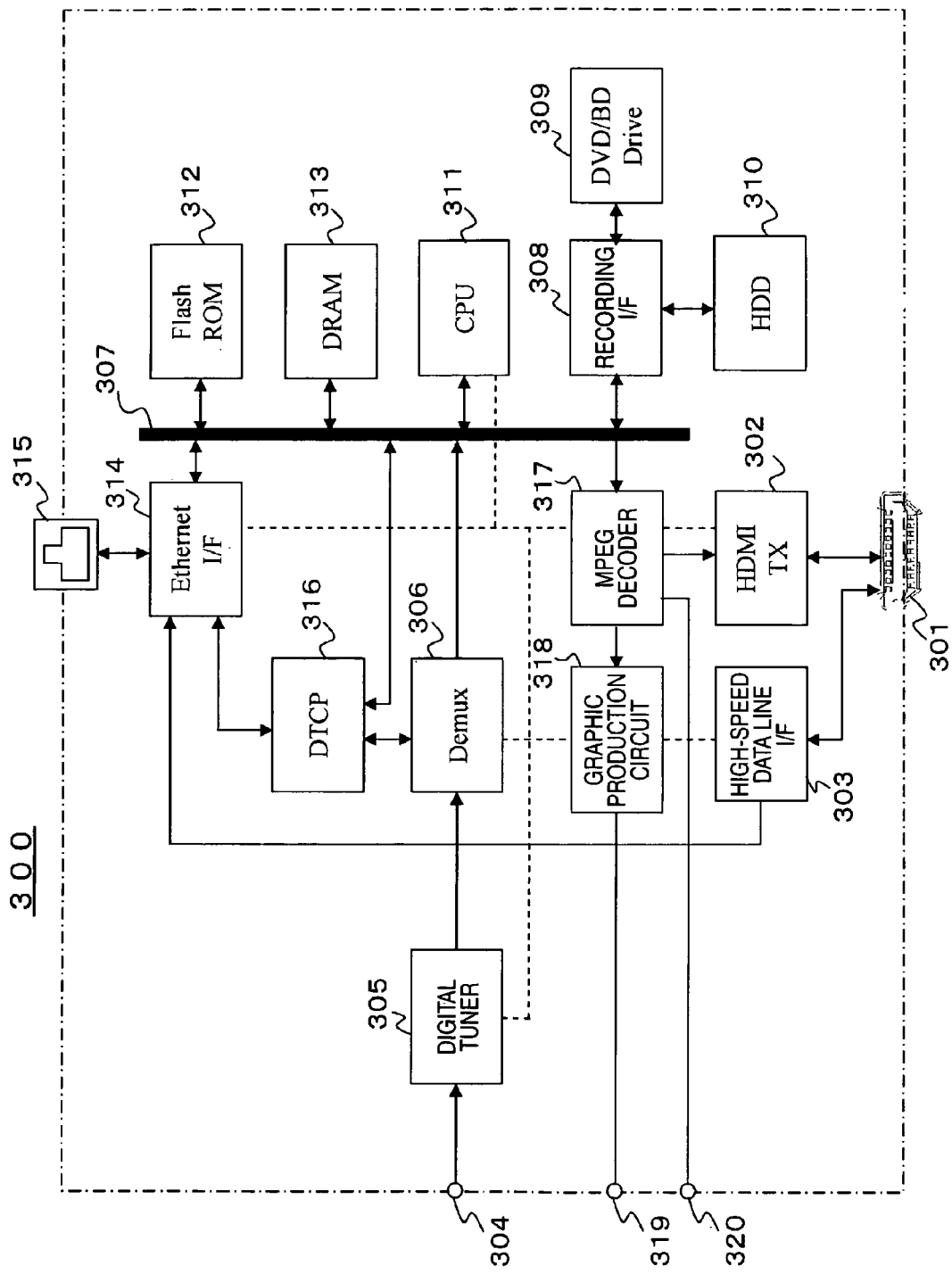
FIG. 5 is a block diagram showing an example of the configuration of a DVD recorder serving as source equipment.

FIG. 5 shows an example of the configuration of the DVD recorder 300. The DVD recorder 300 includes the HDMI terminal 301, the HDMI transmitting unit 302, the high-speed data line interface 303, an antenna terminal 304, a digital tuner 305, a demultiplexer 306, an internal bus 307, a recording unit interface 308, a DVD/BD drive 309, a hard disk drive (HDD) 310, a CPU 311, a flash ROM 312, a DRAM 313, an Ethernet interface 314, a network terminal 315, a DTCP circuit 316, an MPEG decoder 317, a graphic production circuit 318, a video output terminal 319, and an audio output terminal 320. The digital tuner 305 and demultiplexer 306 constitute a broadcast receiving unit.

The HDMI transmitting unit (HDMI source) 302 transmits video (image) data and audio data of the baseband from the HDMI terminal 301 over the HDMI cable 620 through communication conformable to the HDMI. The HDMI transmitting unit 302 will be detailed later.

The high-speed data line interface 303 is a bidirectional communication interface using predetermined lines (in the present embodiment, a reserved line and an HPD line) included in the HDMI cable 620. The high-speed data line interface 303 will be detailed later.

The antenna terminal 304 is a terminal that inputs a television broadcast signal received by the receiving antenna 400. The digital tuner 305 processes the television broadcast signal inputted to the antenna terminal 304 and outputs a predetermined transport stream. The demultiplexer 306 extracts a partial transport stream (TS) (a TS packet of video data and a TS packet of audio data), which is associated with a predetermined selected channel, from the transport stream obtained by the digital tuner 305.

The demultiplexer 306 fetches program-specific information/service information (PSI/SI) from the transport stream obtained by the digital tuner 305, and outputs the PSI/SI to the CPU 311. In the transport stream obtained by the digital tuner 305, multiple channels are multiplexed. The processing in which the demultiplexer 306 extracts the partial TS on an arbitrary channel from the transport stream is enabled by acquiring information concerning a packet ID (PID) on the arbitrary channel from the PSI/SI (PAT/PMT).

The CPU 311, flash ROM 312, DRAM 313, demultiplexer 306, Ethernet interface 314, and recording unit interface 308 are interconnected over the internal bus 307. The DVD/BD drive 309 and HDD 310 are connected onto the internal bus 307 via the recording unit interface 308. The DVD/BD drive 309 and HDD 310 record the partial TS extracted by the demultiplexer 306. The DVD/BD drive 309 and HDD 310 reproduce the partial TS recorded in a recording medium.

The MPEG decoder 317 performs decoding processing on a video PES packet, which is included in the partial TS extracted by the demultiplexer 306 or reproduced by the DVD/BD drive 309 and HDD 310, and provides video data. The MPEG decoder 317 performs decoding processing on an audio PES packet included in the partial TS, and provides audio data.

The graphic production circuit 318 performs, if necessary, graphic data superposing processing or the like on the video data obtained by the MPEG decoder 317. The video output terminal 319 outputs the video data that is outputted from the graphic production circuit 318. The audio output terminal 320 outputs the video data obtained by the MPEG decoder 317.

The DTCP circuit 316 encrypts, if necessary, the partial TS extracted by the demultiplexer 306 or the partial TS reproduced by the DVD/BD drive 309 and HDD 310. The DTCP circuit 316 decrypts the encrypted data fed from the network terminal 315 or high-speed data line interface 303 to the Ethernet interface 314.

The CPU 311 controls the actions of the components of the DVD recorder 300. The flash ROM 312 stores control software and preserves data. The DRAM 313 forms a work area for the CPU 311. The CPU 311 develops software and data, which are read from the flash ROM 312, in the DRAM 313, activates the software, and controls the components of the DVD recorder 300.

The actions in the DVD recorder 300 shown in FIG. 5 will be briefly described below.

A television broadcast signal inputted to the antenna terminal 304 is fed to the digital tuner 305. In the digital tuner 305, a predetermined transport stream is fetched by processing the television broadcast signal, and the predetermined transport stream is fed to the demultiplexer 306. In the demultiplexer 306, a partial TS (a TS packet of video data and a TS packet of audio data) associated with a predetermined channel is extracted from the transport stream. The partial TS is fed to the DVD/BD drive 309 or HDD 310 via the recording unit interface 308, and recorded based on a recording instruction sent from the CPU 311.

The partial TS extracted by the demultiplexer 306 or the partial TS reproduced by the DVD/BD drive 309 or HDD 310 is fed to the MPEG decoder 317. In the MPEG decoder 317, decoding processing is performed on a video PES packet formed with a TS packet of video data in order to obtain video data. The video data is subjected to graphic data superposing processing or the like by the graphic production circuit 318, and then outputted to the video output terminal 319. In the MPEG decoder 317, decoding processing is performed on an audio PES packet formed with a TS packet of audio data in order to obtain audio data. The audio data is outputted to the audio output terminal 320.

The video (image) data and audio data obtained by the MPEG decoder 317 according to the partial TS reproduced by the DVD/BD drive 309 or HDD 310 are fed to the HDMI transmitting unit 302, and transmitted to the audio amplifier 200 over the HDMI cable 620 coupled to the HDMI terminal 302.

In the high-speed data line interface 303, an encrypted partial TS transmitted from the audio amplifier 200 side over predetermined lines of the HDMI cable 620 coupled to the HDMI terminal 301 is received. The partial TS is fed to the DTCP circuit 316 via the Ethernet interface 314, and decrypted thereby.

The partial TS decrypted by the DTCP circuit 316 is fed to the CPU 311. The CPU 311 analyzes the partial TS, and extracts a packet ID (PID) serving as channel selection information signifying what channel is selected in the television receiver 100. The CPU 311 controls the digital tuner 305 and demultiplexer 306 on the basis of the packet ID, and permits selection of the same channel as the channel in the television receiver 100. In this case, when the channel selected in the television receiver 100 is changed to another, the channel selected in the DVD recorder 300 is also changed to another.

In the high-speed data line interface 303, an IP packet containing a remote control code and being transmitted from the audio amplifier 200 side over predetermined lines of the HDMI cable 620 coupled to the HDMI terminal 301 is received. The IP packet is fed to the CPU 311 via the Ethernet interface 314. When the remote control code contained in the IP packet relates to control of the DVD recorder 300, the CPU 311 controls the components of the DVD recorder 300 on the basis of the remote control code.

For example, when the remote control code is what instructs recording, the CPU 311 implements control so that the partial TS extracted by the demultiplexer 306 will be recorded by the DVD/BD drive 309 or HDD 310.

When the partial TS extracted by the demultiplexer 306 or the partial TS reproduced by the DVD/BD drive 309 or HDD 310 is transmitted over a network, after the partial TS is encrypted by the DTCP circuit 316, the resultant partial TS is outputted to the network terminal 315 via the Ethernet interface 314.

Figure 6:
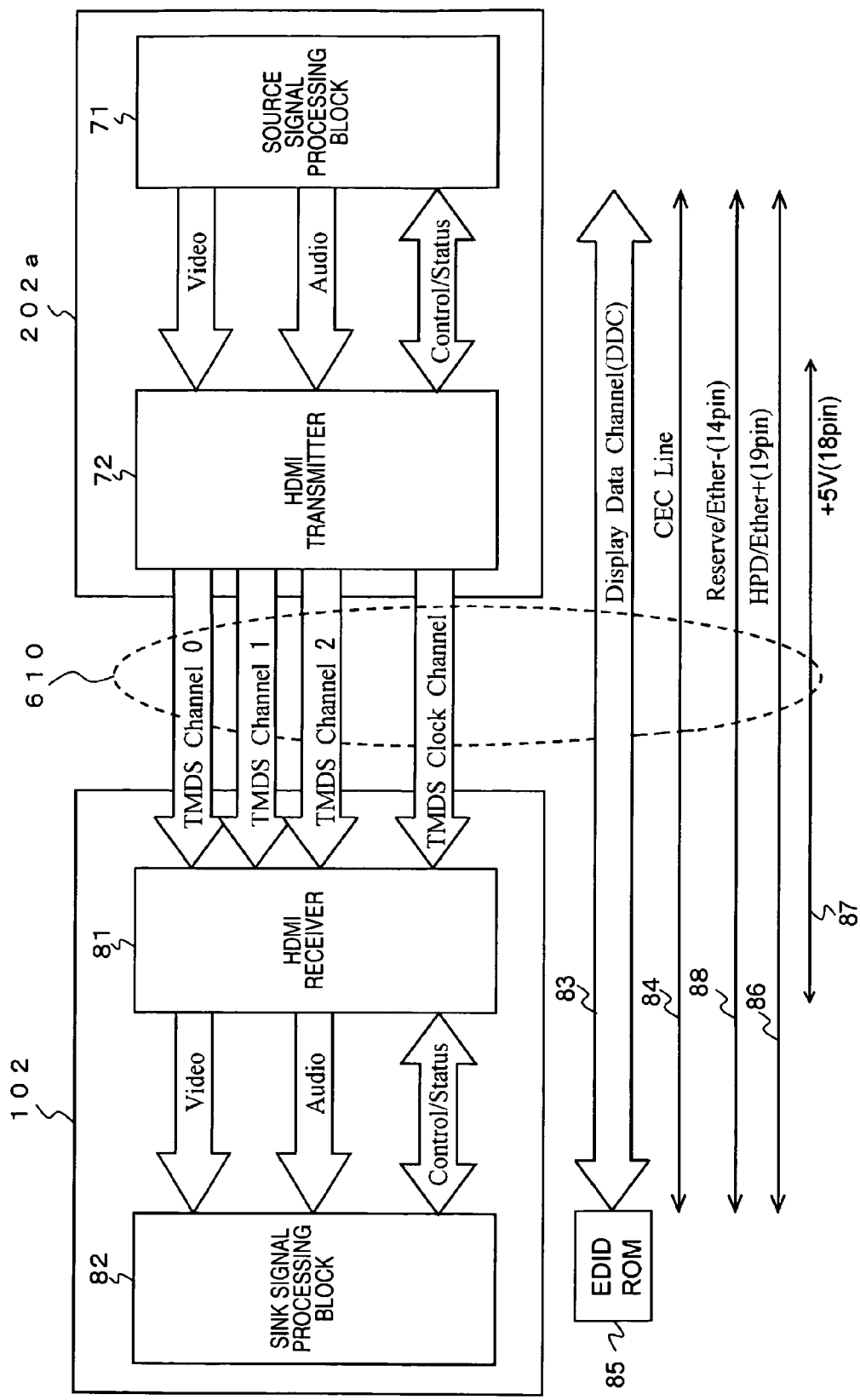
FIG. 6 is a block diagram showing an example of arrangement of an HDMI transmitting unit (HDMI source) and an HDMI receiving unit (HDMI sink)

FIG. 6 shows an example of the arrangement in the communication system 10 shown in FIG. 1 of the HDMI receiving unit (HDMI sink) 102 of the television receiver 100 and the HDMI transmitting unit (HDMI source) 202a of the audio amplifier 200.

The HDMI transmitting unit 202a unidirectionally transmits differential signals of the baseband (non-compressed), which represent image data for one screen, to the HDMI receiving unit 102 on multiple channels during an effective image interval (hereinafter, referred to as an active video interval) that is an interval having a horizontal blanking period and a vertical blanking period excluded from an interval from a certain vertical synchronizing signal to the next vertical synchronizing signal (hereinafter, referred to as a video field). During the horizontal blanking period and vertical blanking period, the HDMI transmitting unit 202a unidirectionally transmits differential signals, which represent audio data, a control packet, and other auxiliary data that accompany image data, to the HDMI receiving unit 102 on multiple channels.

The HDMI transmitting unit 202a includes a source signal processing block 71 and an HDMI transmitter 72. To the source signal processing block 71, non-compressed image (video) data and audio data of the baseband are fed. The source signal processing block 71 performs required processing on the fed image data and audio data, and feeds the resultant image data and audio data to the HDMI transmitter 72. The source signal processing block 71 transfers, if necessary, control information or information indicating a status (control/status), to or from the HDMI transmitter 72.

The HDMI transmitter 72 converts the image data, which is fed from the source signal processing block 71, into differential signals, and unidirectionally transmits the differential signals to the HDMI receiving unit 102, which is connected over the HDMI cable 610, on multiple channels, that is, three TMDS channels #0, #1, and #2.

The transmitter 72 converts audio data, a control packet, or any other auxiliary data accompanying non-compressed image data, and control data items of a vertical synchronizing signal (VSYNC) and a horizontal synchronizing signal (HSYNC), which are fed from the source signal processing block 71, into differential signals, and unidirectionally transmits the differentials signals to the HDMI receiving unit 102, which is connected over the HDMI cable 610, on the three TMDS channels #0, #1, and #2.

The transmitter 72 transmits a pixel clock, which is synchronous with image data items to be transmitted on the three TMDS channels #0, #1, and #2, to the HDMI receiving unit 102, which is connected over the HDMI cable 610, on a TMDS clock channel.

The HDMI receiving unit 102 receives differential signals, which represent image data items and are unidirectionally transmitted from the HDMI transmitting unit 202a on multiple channels, during an active video interval, and also receives differential signals, which represent auxiliary data and control data items and are transmitted from the HDMI transmitting unit 202a on multiple channels, during the horizontal blanking period and vertical blanking period.

The HDMI receiving unit 102 includes an HDMI receiver 81 and a sink signal processing block 82. The HDMI receiver 81 receives the differential signals, which represent image data items and are unidirectionally transmitted from the HDMI transmitting unit 202a, which is connected over the HDMI cable 610, on the TMDS channels #0, #1, and #2, and the differential signals, which represent the auxiliary data and control data items, synchronously with the pixel clock transmitted on the TMDS clock channel from the HDMI transmitting unit 202a. Further, the HDMI receiver 81 converts the differential signals into the representative image data items, auxiliary data, and control data items, and feeds, if necessary, the data items to the sink signal processing block 82.

The sink signal processing block 82 performs required processing on the data items fed from the HDMI receiver 81, and outputs the resultant data items. The sink signal processing block 82 transfers, if necessary, control information and information indicating a status (control/status) to or from the HDMI receiver 81.

The HDMI transmission channels include, in addition to the three TMDs channels #0, #1, and #2 on which image data items, auxiliary data, and control data items are unidirectionally serially transmitted from the HDMI transmitting unit 202a to the HDMI receiving unit 102 synchronously with the pixel clock, and the TMDS clock channel serving as a transmission channel on which the pixel clock is transmitted, transmission channels called a display data channel (DDC) 83 and a CEC line 84.

The DDC 83 is realized with two lines (signal lines) that are included in the HDMI cable 610 and are not shown, and is used when source equipment reads enhanced-extended display identification (E-EDID) from sink equipment connected over the HDMI cable 610. Namely, the sink equipment includes an EDIDROM 85. The source equipment reads the E-EDID, which is stored in the EDIDROM 85, from the sink equipment, which is connected over the HDMI cable 610, over the DDC 83, and recognizes the settings and performance of the sink equipment on the basis of the E-EDID.

The CEC line 84 is formed with one line that is included in the HDMI cable 610 and is not shown, and is used to perform bidirectional communication of control data items between source equipment and sink equipment.

The HDMI cable 620 includes a line 86 coupled to a pin called Hot Plug Detect (HPD). Source equipment can detect connection of sink equipment by utilizing the line 86. A line 87 to be used to supply power from source equipment to sink equipment is further included in the HDMI cable 620. A reserved line 88 is further included in the HDMI cable 610.

Figure 7:
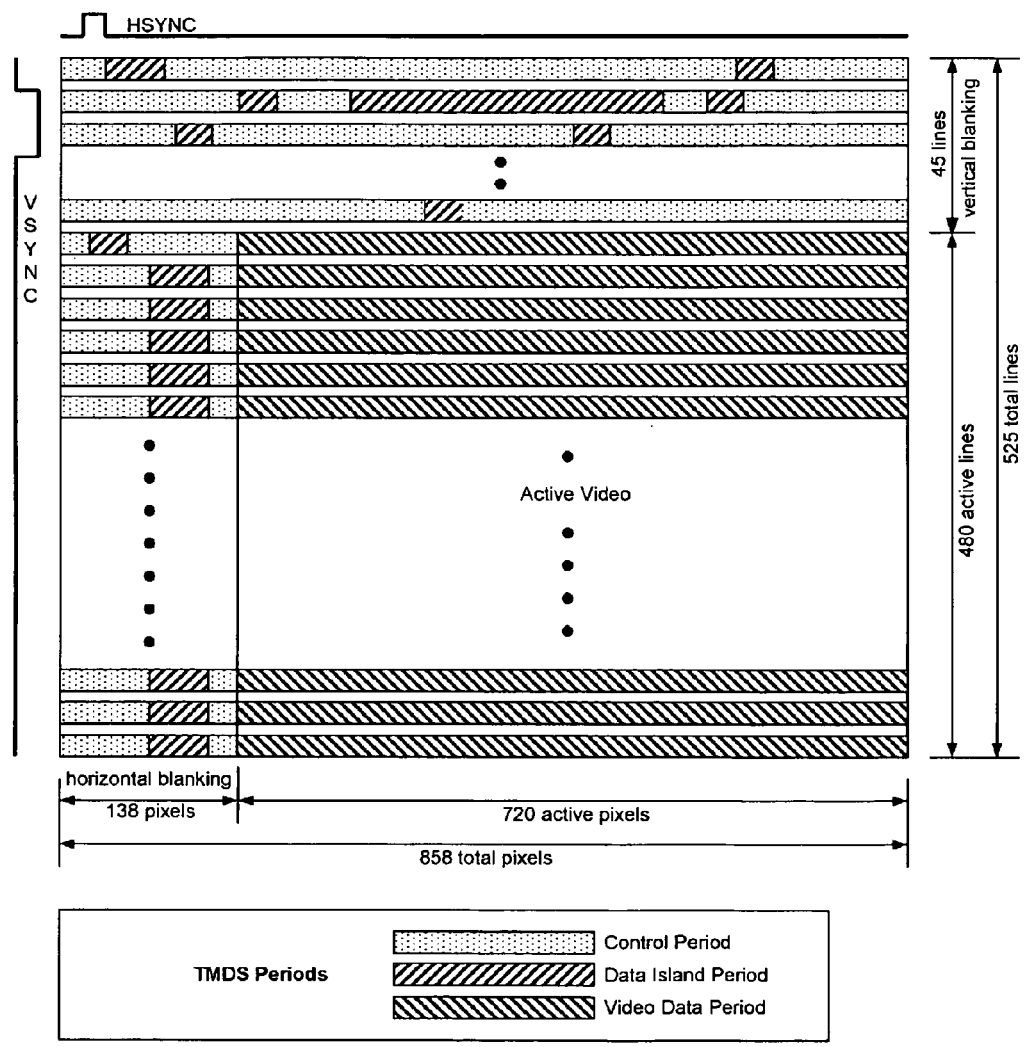
FIG. 7 is a diagram showing the structure of TMDS transmission data.

FIG. 7 shows an example of transmission intervals (periods) during which various kinds of transmission data items are transmitted on the three TMDS channels #0, #1, and #2 conformable to the HDMI. FIG. 7 shows the intervals for the various kinds of transmission data items to be transmitted in a case where a progressive image of 720 pixels sideways×480 pixels lengthwise is transmitted on the TMDS channels #0, #1, and #2.

Within a video field during which transmitted data items are transmitted on the three TMDS channels #0, #1, and #2 conformable to the HDMI, three intervals of a video data interval (video data period), a data island interval (data island period), and a control interval (control period) are defined.

The video field interval is an interval from the leading edge (active edge) of a certain vertical synchronizing signal to the leading edge of the next vertical synchronizing signal, and is divided into a horizontal blanking period (horizontal blanking), a vertical blanking period (vertical blanking), and an active video interval (active video) that is an interval having the horizontal blanking period and vertical blanking period removed from the video field interval.

The video data interval is allocated to the active video interval. Within the video data interval, effective pixels (active pixel) corresponding to a product of 720 pixels×480 lines and constituting non-compressed image data items for one screen are transmitted during the video data interval.

The data island interval and control interval are allocated to the horizontal blanking period and vertical blanking period. During the data island interval and control interval, auxiliary data is transmitted.

Specifically, the data island interval is allocated to parts of the horizontal blanking period and vertical blanking periods. During the data island interval, data out of the auxiliary data that does not relate to control, for example, a packet of audio data is transmitted.

The control interval is allocated to the other parts of the horizontal blanking period and vertical blanking period. During the control interval, data out of the auxiliary data that does not relate to control, for example, a vertical synchronizing signal, a horizontal synchronizing signal, and a control packet are transmitted.

According to the ongoing HDMI, the frequency of a pixel clock to be transmitted on the TMDS clock channel is, for example, 165 MHz. In this case, the transfer rate for the data island interval is on the order of approximately 500 Mbps.

FIG. 8 shows the pin assignments of the HDMI terminals 101 and 201a respectively. The pin assignments are called type A assignments.

Two lines that are differential lines over which differential signals TMDS Data#i+ and TMDS Data#i− on the TMDS channel #i are transmitted are coupled to a pin (any of pins whose pin numbers are 1, 4, and 7) to which TMDS Data#i+ is assigned, and a pin (any of pins whose pin numbers are 3, 6, and 9) to which TMDS Data#i− is assigned.

The CEC line 84 over which a CEC signal representing control data is transmitted is coupled to a pin whose pin number is 13. A pin whose pin number is 14 is an unused (reserved) pin. A line over which a serial data (SDA) signal such as E-EDID is transmitted is coupled to a pin whose pin number is 16. A line over which a serial clock (SCL) signal that is a clock signal to be used for synchronization at the time of transmitting or receiving the SDA signal is transmitted is coupled to a pin whose pin number is 15. The DDC 83 is formed with the line over which the SDA signal is transmitted and the line over which the SCL signal is transmitted.

The line 86 which the source equipment 110 uses, as mentioned above, to detect connection of the sink equipment 120 is coupled to a pin whose pin number is 19. The line 87 to be used to, as mentioned above, supply power is coupled to a pin whose pin number is 18.

FIG. 6 shows an example of the arrangement in the communication system 10 shown in FIG. 1 of the HDMI transmitting unit (HDMI source) 202*a* of the audio amplifier 200 and the HDMI receiving unit (HDMI sink) 102 of the television receiver 100. The HDMI transmitting unit 302 of the DVD recorder 300 and the HDMI receiving unit 202*b* of the audio amplifier 200 in the communication system 10 shown in FIG. 1 are arranged in the same manner, though a detail will be omitted.

Figure 9:
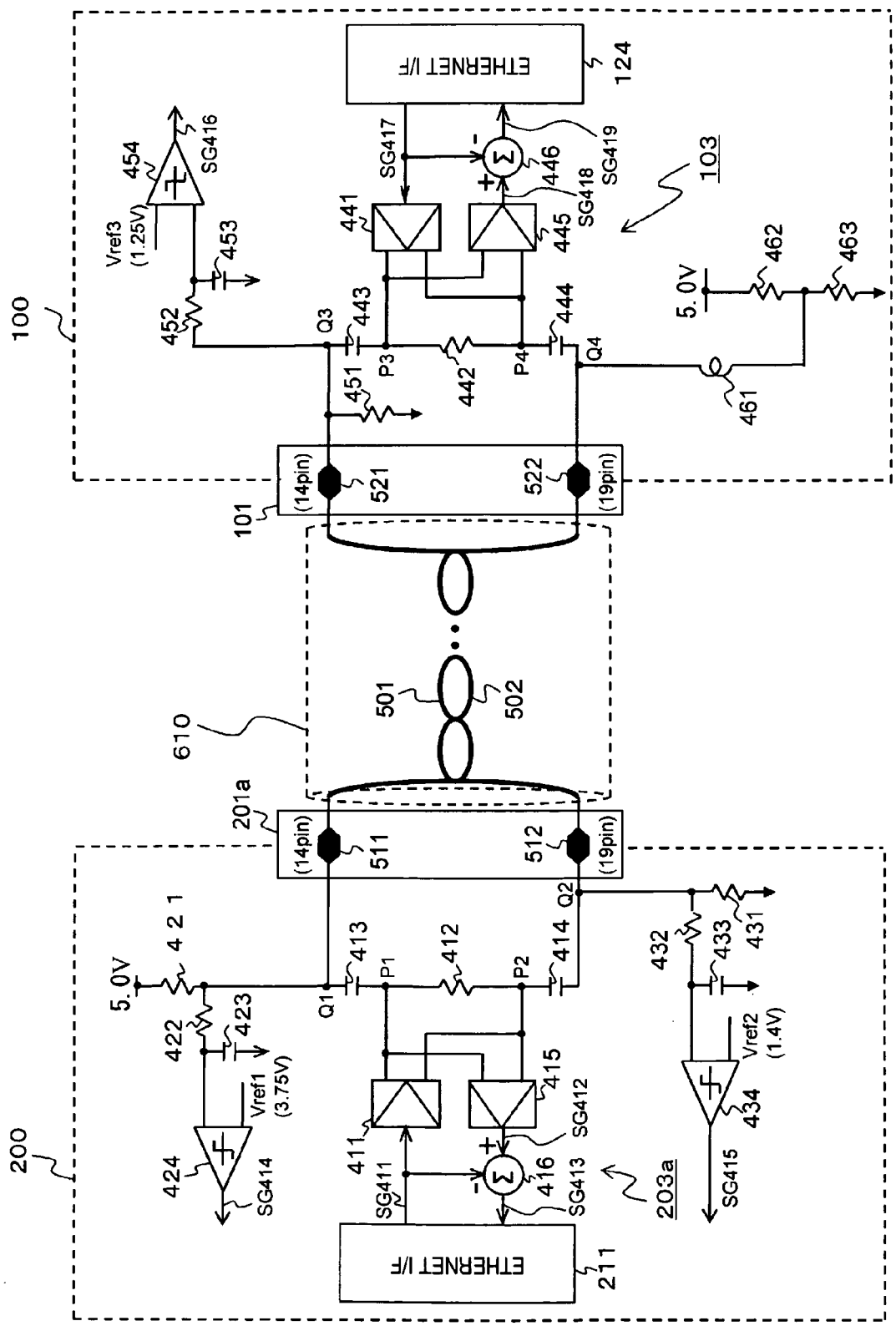
FIG. 9 is a connection diagram showing an example of arrangement of a high-speed data line interface 103 of a television receiver 100 and a high-speed data line interface 203a of an audio amplifier 200.

FIG. 9 shows an example of the arrangement in the communication system 10 shown in FIG. 1 of the high-speed data line interface 103 of the television receiver 100 and the high-speed data line interface 203*a* of the audio amplifier 200. The interfaces 103 and 203*a* constitute a communication unit that performs local-area network (LAN) communication. The communication unit performs communication using a pair of differential lines out of the multiple lines constituting the HDMI cable 610, that is, in the present embodiment, a reserved line (Ether−line) coupled to an unused (reserve) pin (14 pin) and an HPD line (Ether+line) coupled to an HPD pin (19 pin).

The audio amplifier 200 includes a LAN signal transmission circuit 411, a terminal resistor 412, ac-coupling capacitors 413 and 414, a LAN signal reception circuit 415, a subtraction circuit 416, a pull-up resistor 421, a resistor 422 and a capacitor 423 constituting a low-pass filter, a comparator 424, a pull-down resistor 431, a resistor 432 and a capacitor 433 constituting a low-pass filter, and a comparator 434. Herein, the high-speed data line interface 203*a* is composed of the LAN signal transmission circuit 411, terminal resistor 412, ac-coupling capacitors 413 and 414, LAN signal reception circuit 415, and subtraction circuit 416.

Between a power line (+5.0 V) and a ground line, a series circuit composed of the pull-up resistor 421, ac-coupling capacitor 413, terminating resistor 412, ac-coupling capacitor 414, and pull-down resistor 431 is connected. A junction point P1 between the ac-coupling capacitor 413 and terminating resistor 412 is connected to the positive output side of the LAN signal transmission circuit 411, and also connected to the positive input side of the LAN signal reception circuit 415. A junction point P2 between the ac-coupling capacitor 414 and terminating resistor 412 is connected to the negative output side of the LAN signal transmission circuit 411, and also connected to the negative input side of the LAN-signal reception circuit 415. To the input side of the LAN signal transmission circuit 411, a transmitted signal SG 411 is fed from the Ethernet interface 211.

To the positive terminal of the subtraction circuit 416, an output signal SG412 of the LAN signal reception circuit 415 is fed. To the negative terminal of the subtraction circuit 416, the transmitted signal SG411 is fed from the Ethernet interface 211. In the subtraction circuit 416, the transmitted signal SG411 is subtracted from the output signal SG412 of the LAN signal reception circuit 415. The output signal SG413 of the subtraction circuit 416 is fed to the Ethernet interface 211.

A junction point Q1 between the pull-up resistor 421 and ac-coupling capacitor 413 is connected to the ground line via the series circuit composed of the resistor 422 and capacitor 423. An output signal of the low-pass filter developed at the junction point between the resistor 422 and capacitor 423 is fed to one of the input terminals of the comparator 424. In the comparator 424, the output signal of the low-pass filter is compared with a reference voltage Vref1 (+3.75 V) fed to the other input terminal. An output signal SG414 of the comparator 424 is fed to the CPU 213 (not shown).

A junction point Q2 between the ac-coupling capacitor 414 and pull-down resistor 431 is connected to the ground line via the series circuit of the resistor 432 and capacitor 433. An output signal of the low-pass filter developed at the junction point between the resistor 432 and capacitor 433 is fed to one of the input terminals of the comparator 434. In the comparator 434, the output signal of the low-pass filter is compared with a reference voltage Vref2 (+1.4 V) fed to the other input terminal. An output signal SG415 of the comparator 434 is fed to the CPU 213.

The television receiver 100 includes a LAN signal transmission circuit 441, a terminating resistor 442, ac-coupling capacitors 443 and 444, a LAN signal reception circuit 445, a subtraction circuit 446, a pull-down resistor 451, a resistor 452 and a capacitor 453 constituting a low-pass filter, a comparator 454, a choke coil 461, a resistor 462, and a resistor 463. Herein, the high-speed data line interface 103 is composed of the LAN signal transmission circuit 441, terminating resistor 442, ac-coupling capacitors 443 and 444, LAN signal reception circuit 445, and subtraction circuit 446.

Between a power line (+5.0 V) and a ground line, a series circuit of the resistor 462 and resistor 463 is connected. Between a junction point between the resistor 462 and resistor 463 and the ground line, a series circuit composed of the choke coil 461, ac-coupling capacitor 444, terminating resistor 442, ac-coupling capacitor 443, and pull-down resistor 451 is connected.

A junction point P3 between the ac-coupling capacitor 443 and terminating resistor 442 is connected to the positive output side of the LAN signal transmission circuit 441, and also connected to the positive input side of the LAN signal reception circuit 445. A junction point P4 between the ac-coupling capacitor 444 and terminating resistor 442 is connected to the negative output side of the LAN signal transmission circuit 441, and also connected to the negative input side of the LAN signal reception circuit 445. To the input side of the LAN signal transmission circuit 441, a transmitted signal SG 417 is fed from the Ethernet interface 124.

To the positive terminal of the subtraction circuit 446, an output signal SG418 of the LAN signal reception circuit 445 is fed. To the negative terminal of the subtraction circuit 446, the transmitted signal SG417 is fed from the Ethernet interface 124. In the subtraction circuit 446, the transmitted signal SG417 is subtracted from the output signal SG418 of the LAN signal reception circuit 445. The output signal SG419 of the subtraction circuit 446 is fed to the Ethernet interface 124.

A junction point Q3 between the pull-down resistor 451 and ac-coupling capacitor 443 is connected to the ground line via a series circuit of the resistor 452 and capacitor 453. An output signal of the low-pass filter developed at the junction point between the resistor 452 and capacitor 453 is fed to one of the input terminals of the comparator 454. In the comparator 454, the output signal of the low-pass filter is compared with a reference voltage Vref3 (+1.25 V) fed to the other input terminal. An output signal SG416 of the comparator 454 is fed to the CPU 121 (not shown).

The reserved line 501 and HPD line 502 included in the HDMI cable 610 constitute a differential twisted pair. The source-side end 511 of the reserved line 501 is coupled to the 14 pin of the HDMI terminal 201*a*, and the sink-side end of the reserved line 501 is coupled to the pin 521 (14 pin) of the HDMI terminal 101. The source-side end 512 of the HPD line 502 is coupled to the 19 pin of the HDMI terminal 201a, and the sink-side end 522 of the HPD line 502 is coupled to the 19 pin of the HDMI terminal 101.

In the audio amplifier 200, the junction point Q1 between the pull-up resistor 421 and ac-coupling capacitor 413 is connected to the 14 pin of the HDMI terminal 201a. The junction point Q2 between the pull-down resistor 431 and ac-coupling capacitor 414 is connected to the 19 pin of the HDMI terminal 201a. On the other hand, in the television receiver 100, the junction point Q3 between the pull-down resistor 451 and ac-coupling capacitor 443 is connected to the 14 pin of the HDMI terminal 101. The junction point Q4 between the choke coil 461 and ac-coupling capacitor 444 is connected to the 19 pin of the HDMI terminal 101.

Next, the actions for LAN communication performed by the high-speed data line interfaces 103 and 203a having the foregoing components will be described below.

In the audio amplifier 200, the transmitted signal SG411 outputted from the Ethernet interface 211 is fed to the input side of the LAN signal transmission circuit 411. Differential signals (a positive output signal and a negative output signal) associated with the transmitted signal SG411 are outputted from the LAN signal transmission circuit 411. The differential signals outputted from the LAN signal transmission circuit 411 are fed to the junction points P1 and P2 respectively, and transmitted to the television receiver 100 over a pair of lines (the reserved line 501 and HPD line 502) included in the HDMI cable 610.

In the television receiver 100, the transmitted signal SG417 outputted from the Ethernet interface 124 is fed to the input side of the LAN signal transmission circuit 441, and differential signals (a positive output signal and a negative output signal) associated with the transmitted signal SG417 are outputted from the LAN signal transmission circuit 441. The differential signals outputted from the LAN signal transmission circuit 441 are fed to the junction points P3 and P4 respectively, and transmitted to the audio amplifier 200 over a pair of lines (the reserved line 501 and HPD line 502) of the HDMI cable 610.

In the audio amplifier 200, since the input side of the LAN signal reception circuit 415 is connected to the junction points P1 and P2, an additive signal between the transmitted signal associated with the differential signals (current signals) outputted from the LAN signal transmission circuit 441 and the received signal associated with the differential signals transmitted from the television receiver 100 as mentioned above is obtained as the output signal SG412 of the LAN signal reception circuit 415. In the subtraction circuit 416, the transmitted signal SG411 is subtracted from the output signal SG412 of the LAN signal reception circuit 415. Therefore, the output signal SG413 of the subtraction circuit 416 corresponds to the transmitted signal SG417 of the television receiver 100.

In the television receiver 100, since the input side of the LAN signal reception circuit 445 is connected to the junction points P3 and P4, an additive signal between the transmitted signal associated with the differential signals (current signals) outputted from the LAN signal transmission circuit 441 and the received signal associated with the differential signals transmitted from the audio amplifier 200 as mentioned above is obtained as the output signal SG418 of the LAN signal reception circuit 445. In the subtraction circuit 446, the transmitted signal SG417 is subtracted from the output signal SG418 of the LAN signal reception circuit 445. Therefore, the output signal SG419 of the subtraction circuit 446 corresponds to the transmitted signal SG411 of the audio amplifier 200.

Between the high-speed data line interface 103 of the television receiver 100 and the high-speed data line interface 203a of the audio amplifier 200, bidirectional LAN communication can be performed.

In FIG. 9, the HPD line 502 is used for, in addition to the LAN communication, propagation to the audio amplifier 200 of the fact that the HDMI cable 610 has been plugged into the television receiver 100 at a DC bias level. Specifically, when the HDMI cable 610 is plugged into the television receiver 100, the resistors 462 and 463 and the choke coil 461 in the television receiver 100 bias the HPD line 502 to approximately 4 V through the 19 pin of the HDMI terminal 101. The audio amplifier 200 uses the lo-pass filter, which is composed of the resistor 432 and capacitor 433, to sample the dc bias on the HPD line 502, and uses the comparator 434 to compare the dc bias with a reference voltage Vref2 (for example, 1.4 V).

When the HDMI cable 610 is not plugged into the television receiver 100, the voltage at the 19 pin of the HDMI terminal 201a is lower than the reference voltage Vref2 because of presence of the pull-down resistor 431. In contrast, when the HDMI cable 610 is plugged into the television receiver 100, the voltage at the 19 pin is higher than the reference voltage Vref2. Therefore, when the HDMI cable 610 is plugged into the television receiver 100, the output signal SG415 of the comparator 434 assumes a high level. Otherwise, the output signal SG415 assumes a low level. Therefore, based on the output signal SG415 of the comparator 434, the CPU 213 of the audio amplifier 200 can recognize whether the HDMI cable 610 has been plugged into the television receiver 100.

In FIG. 9, the pieces of equipment interconnected at both the ends of the HDMI cable 610 have the function of recognizing based on the dc bias potential on the reserved line 501 whether the remote equipment is equipment supporting LAN communication (hereinafter, referred to as e-HDMI compatible equipment) or equipment not supporting LAN communication (hereinafter, referred to as e-HDMI incompatible equipment).

As mentioned above, the audio amplifier 200 pulls up (+5 V) the reserved line 501 using the resistor 421, and the television receiver 100 pulls down the reserved line 501 using the resistor 451. The resistors 421 and 451 do not exist in the e-HDMI incompatible equipment.

The audio amplifier 200 uses, as mentioned above, the comparator 424 to compare the dc potential on the reserved line 501, which has passed through the low-pass filter composed of the resistor 422 and capacitor 423, with the reference voltage Vref1. When the television receiver 100 is e-HDMI compatible equipment and includes the pull-down resistor 451, the voltage on the reserved line 501 is 2.5 V. However, when the television receiver 100 is e-HDMI incompatible equipment and does not include the pull-down resistor 451, the voltage on the reserved line 501 is 5 V because of presence of the pull-up resistor 421.

Therefore, when the reference voltage Vref1 is set to, for example, 3.75 V, if the television receiver 100 is e-HDMI compatible equipment, the output signal SG414 of the comparator 424 assumes a low level. Otherwise, the output signal SG414 assumes a high level. The CPU 213 of the audio amplifier 200 can recognize based on the output signal SG414 of the comparator 424 whether the television receiver 100 is e-HDMI compatible equipment.

Likewise, the television receiver 100 uses, as mentioned above, the comparator 454 to compare the dc potential on the reserved line 501, which has passed through the low-pass filter composed of the resistor 452 and capacitor 453, with the reference voltage Vref3. When the audio amplifier 200 is e-HDMI compatible equipment and includes the pull-up resistor 421, the voltage on the reserved line 501 is 2.5 V. However, when the audio amplifier 200 is e-HDMI incompatible equipment and does not include the pull-up resistor 421, the voltage on the reserved line 501 is 0 V because of presence of the pull-down resistor 451.

When the reference voltage Vref3 is set to, for example, 1.25 V, if the source equipment 110 is e-HDMI compatible equipment, the output signal SG416 of the comparator 454 assumes the high level. Otherwise, the output signal SG416 of the comparator 454 assumes the low level. Based on the output signal SG416 of the comparator 454, the CPU 121 of the television receiver 100 can recognize whether the audio amplifier 200 is e-HDMI compatible equipment.

The pull-up resistor 421 shown in FIG. 9 may be included in the HDMI cable 610 other than the audio amplifier 200. In this case, the terminals of the pull-up resistor 421 are connected onto lines (signal lines), which are spliced or coupled to the reserved line 501 or a power supply (supply potential) respectively, out of the lines included in the HDMI cable 610.

The pull-down resistor 451 and resistor 463 shown in FIG. 9 may be included in the HDMI cable 610 other than the television receiver 100. In this case, the terminals of the pull-down resistor 451 are connected onto the reserved line 501 and a line (ground line), which is coupled to the ground (reference potential), out of the lines included in the HDMI cable 610. The terminals of the resistor 463 are connected onto the HPD line 502 and the line (ground line), which is coupled to the ground (reference potential), out of the lines included in the HDMI cable 610.

FIG. 9 shows an example of the arrangement in the communication system 10 shown in FIG. 1 of the high-speed data line interface 103 of the television receiver 100 and the high-speed data line interface 203a of the audio amplifier 200. The high-speed data line interface 203b of the audio amplifier 200 and the high-speed data line interface 303 of the DVD recorder 300 included in the communication system 10 shown in FIG. 1 are arranged in the same manner.

Next, various operating sequences in the communication system 10 shown in FIG. 1 will be described below. To begin with, referring to the sequence diagram of FIG. 10, a "one-touch recording" sequence for recording a picture (image) being seen on the television receiver 100 will be described below.

(a) When a user uses the remote control transmitter 127 to perform a receiving channel changing manipulation (channel change), (b) the CPU 121 of the television receiver 100 controls the digital tuner 106 and demultiplexer 107 so as to attain a receiving state for the channel selected by the user. (c) When a receiving channel is changed to another as mentioned above, the television receiver 100 uses the DTCP circuit 116 to encrypt a partial TS extracted by the demultiplexer 107, and then transmits the resultant TS to the DVD recorder 300 via the Ethernet interface 124 and high-speed data line interface 103.

(d) The DVD recorder 300 uses the high-speed data line interface 303 to receive the partial TS sent from the television receiver 100, and uses the DTCP circuit 306 to decrypt the partial TS. The CPU 311 of the DVD recorder 300 controls the digital tuner 305 and demultiplexer 306 on the basis of channel selection information (packet ID) contained in the partial TS so as to attain a receiving state for the same channel as the channel received by the television receiver 100.

(e) Thereafter, when the user uses the remote control transmitter 127 to instruct recording (one-touch record), the CPU 121 of the television receiver 100 (f) produces an IP packet which contains a remote control code (remote control signal) instructing recording and being received by the remote control receiving unit 126, and (g) transmits the IP packet to the DVD recorder 300 via the Ethernet interface 124 and high-speed data line interface 103.

(h) The DVD recorder 300 receives the IP packet sent from the television receiver 100 using the high-speed data line interface 303. The CPU 311 of the DVD recorder 300 allows the DVD/BD drive 309 or HDD 310 to initiate recording of the partial TS, which is extracted by the demultiplexer 306, on the basis of the remote control code instructing recording and being contained in the IP packet.

(i) The CPU 311 of the DVD recorder 300 produces an IP packet that has recording status information concerning the DVD/BD drive 309 or HDD 310 contained in a payload thereof, and transmits the IP packet to the television receiver 100 via the Ethernet interface 314 and high-speed data line interface 303.

(j) The television receiver 100 receives the IP packet sent from the DVD recorder 300 using the high-speed data line interface 103. The CPU 121 controls, if necessary, the graphic production circuit 110 on the basis of the recording status information contained in the IP packet, and displays the recording status on the display panel 112 while superposing the recording status on an image.

Figure 10:
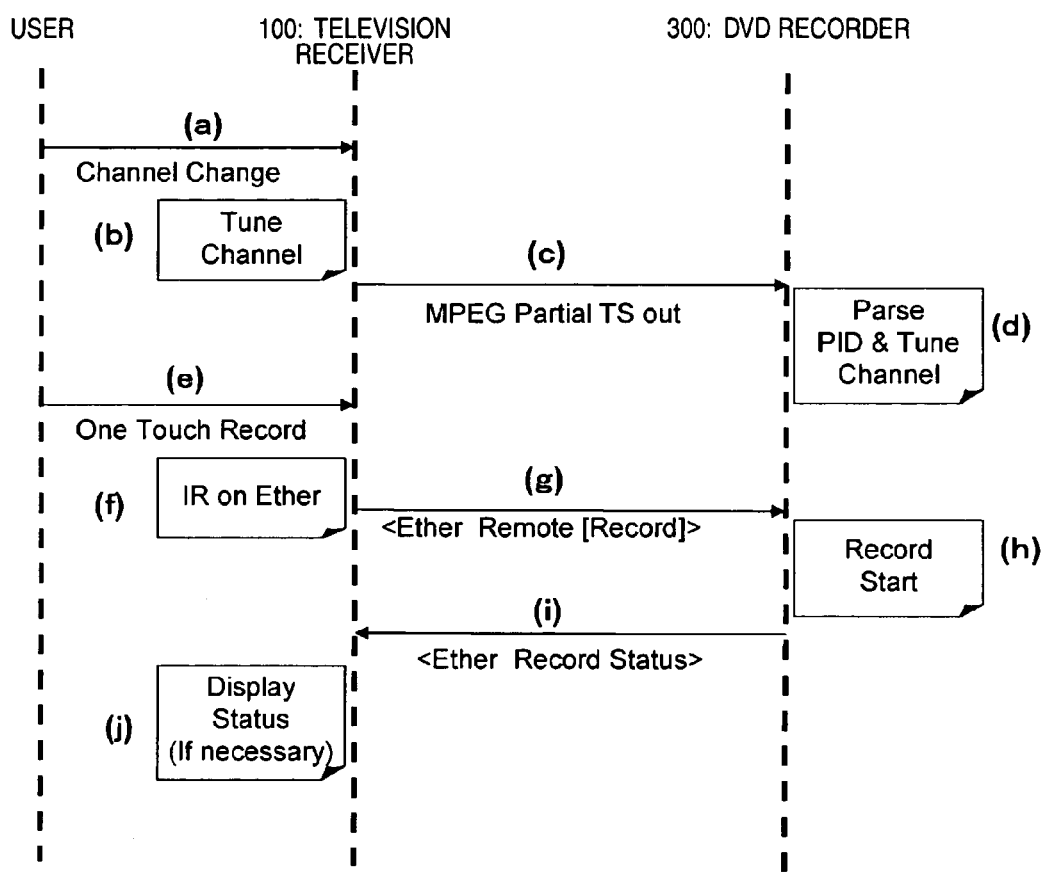
FIG. 10 is a diagram for explaining a "one-touch recording" sequence of recording a picture (image), which is seen on the television receiver 100, with a DVD recorder 300.

According to the "one-touch recording" sequence mentioned in FIG. 10, when the receiving channel of the television receiver 100 is changed to another, a partial TS containing channel selection information is immediately transmitted to the DVD recorder 300 side via the high-speed data line interface 103. The receiving channel of the DVD recorder 300 is then changed to another. When a user instructs recording, an IP packet containing a remote control command that instructs recording is immediately transmitted to the DVD recorder 300 via the high-speed data line interface 103. Therefore, recording of the partial TS on the receiving channel on which the television receiver 100 is viewed can be immediately initiated in the DVD recorder 300.

Figure 11:
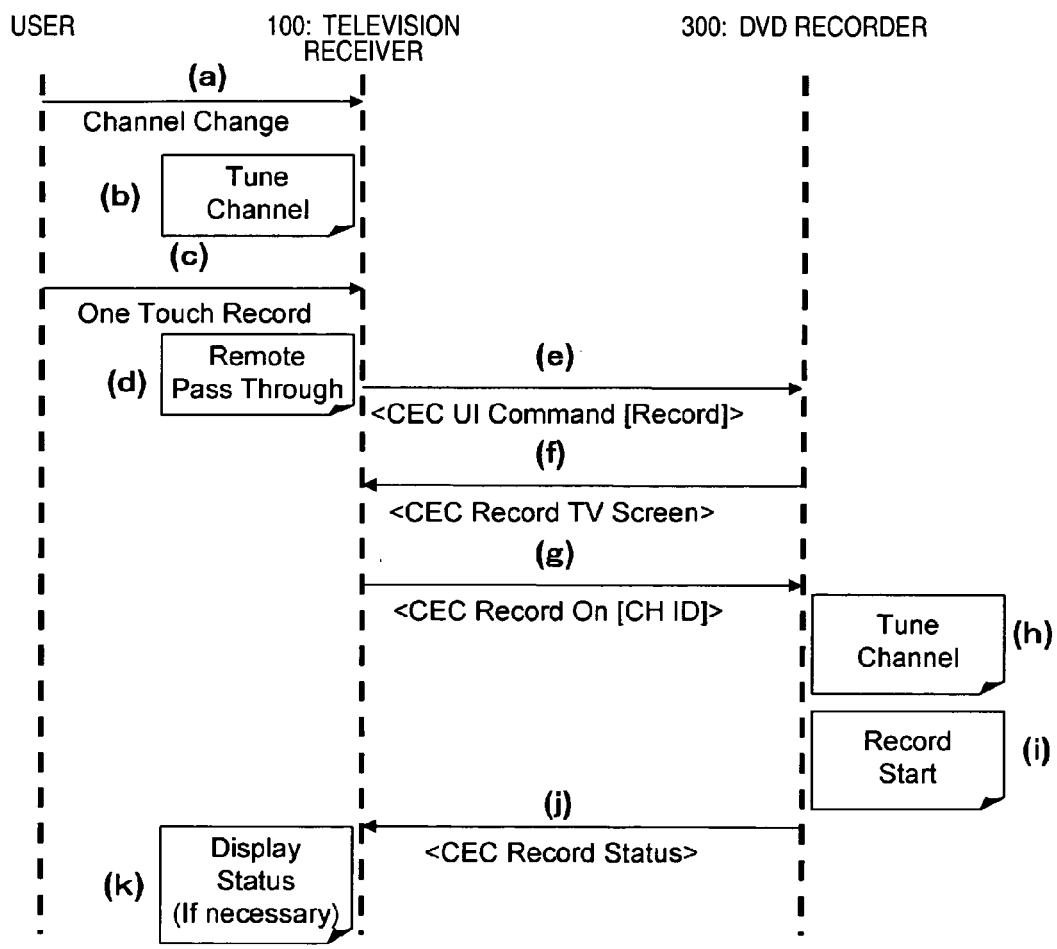
FIG. 11 is a diagram showing as a comparative example a "one-touch recording" sequence to be employed in a case where a high-speed data line interface is not included.

Incidentally, FIG. 11 shows as a comparative example the "one-touch recording" sequence to be followed in a case where the pieces of equipment of the communication system 10 shown in FIG. 1 do not include the high-speed data line interface.

(a) When a user uses the remote control transmitter 127 to perform a receiving channel changing manipulation (channel change), (b) the CPU 121 of the television receiver 100 controls the digital tuner 106 and demultiplexer 107 so as to attain a receiving state for a channel selected by the user.

(c) Thereafter, when the user uses the remote control transmitter 127 to instruct recording (one touch record), the CPU 121 of the television receiver 100 (d) converts a remote control code, which instructs recording and is received by the remote control receiving unit 126, into a command employed in HDMI CEC control, and (e) transmits the command to the DVD recorder 300 using the CEC line.

(f) After receiving the recording instructing command, the DVD recorder 300 inquires the television receiver 100 for receiving channel information using the CEC line. (g) In response to the inquiry, the television receiver 100 transmits the receiving channel information to the DVD recorder 300 using the CEC line.

(h) Based on the receiving channel information sent from the television receiver 100, the CPU 311 of the DVD recorder 300 controls the digital tuner 305 and demultiplexer 306 so as to square the receiving channel thereof with the receiving channel of the television receiver 100, and (i) allows the DVD/BD drive 309 or HDD 310 to initiate recording of the partial TS extracted by the demultiplexer 306.

(j) The CPU 311 of the DVD recorder 300 transmits the recording status information on the DVD/BD drive 309 or HDD 310 to the television receiver 100 using the CEC line. (k) Based on the recording status information sent from the DVD recorder 300, the television receiver 100 controls, if necessary, the graphic production circuit 110, and displays the recording status on the display panel 112 while superposing the recording status on an image.

According to the "one-touch recording" sequence mentioned in FIG. 11, after a user instructs recording, the receiving channel of the DVD recorder 300 is squared with the receiving channel of the television receiver 100 in order to initiate recording. Transmission of a recording instructing command from the television receiver 100 to the DVD recorder 300, inquiry for receiving channel information from the DVD recorder 300 to the television receiver 100, and transmission of the receiving channel information from the television receiver 100 to the DVD recorder 300 are performed using the CEC line characteristic of a low transmission speed. Therefore, a very long time is required until recording is initiated after a user instructs recording.

Next, referring to the sequence diagram of FIG. 12, a "theater mode" sequence for changing audio outputs between the television receiver 100 and audio amplifier 200 will be described below.

(a) When a user uses the remote control transmitter 127 to designate a "theater mode," (b) the CPU 121 of the television receiver 100 controls the audio amplification circuit 114 so as to mute the audio output of the loudspeaker 115. (c) The CPU 121 of the television receiver 100 then produces an IP packet containing a muting canceling command for the audio amplifier 200, and transmits the IP packet to the audio amplifier 200 via the Ethernet interface 124 and high-speed data line interface 103.

(d) The audio amplifier 200 receives the IP packet sent from the television receiver 100 using the high-speed data line interface 203a. Based on the muting canceling command contained in the IP packet, the CPU 213 controls the audio amplification circuit 208 so as to cancel muting of the audio output of the 5.1-channel loudspeaker group 500. Accordingly, a state in which sounds are outputted through the loudspeaker 115 of the television receiver 100 is switched to the "theater mode" in which sounds are outputted through the loudspeaker group 500 connected to the audio amplifier 200.

In this case, the television receiver 100 uses the DTCP circuit 116 to encrypt the partial TS extracted by the demultiplexer 107, and then transmits the resultant partial TS to the audio amplifier 200 via the Ethernet interface 124 and high-speed data line interface 103. The audio amplifier 200 receives the partial TS sent from the television receiver 100 using the high-speed data line interface 203a, and outputs an audio signal, which represents audio data contained in the partial TS, from the audio processing circuit 207. Therefore, when the audio amplification circuit 208 is controlled as mentioned above in order to cancel muting of the audio output of the 5.1-channel loudspeaker group 500, sounds are immediately outputted through the loudspeaker group 500.

(e) After canceling muting, the CPU 213 of the audio amplifier 200 produces an IP packet having the result contained in a payload thereof, and transmits the IP packet to the television receiver 100 via the Ethernet interface 211 and high-speed data line interface 203a.

Figure 12:
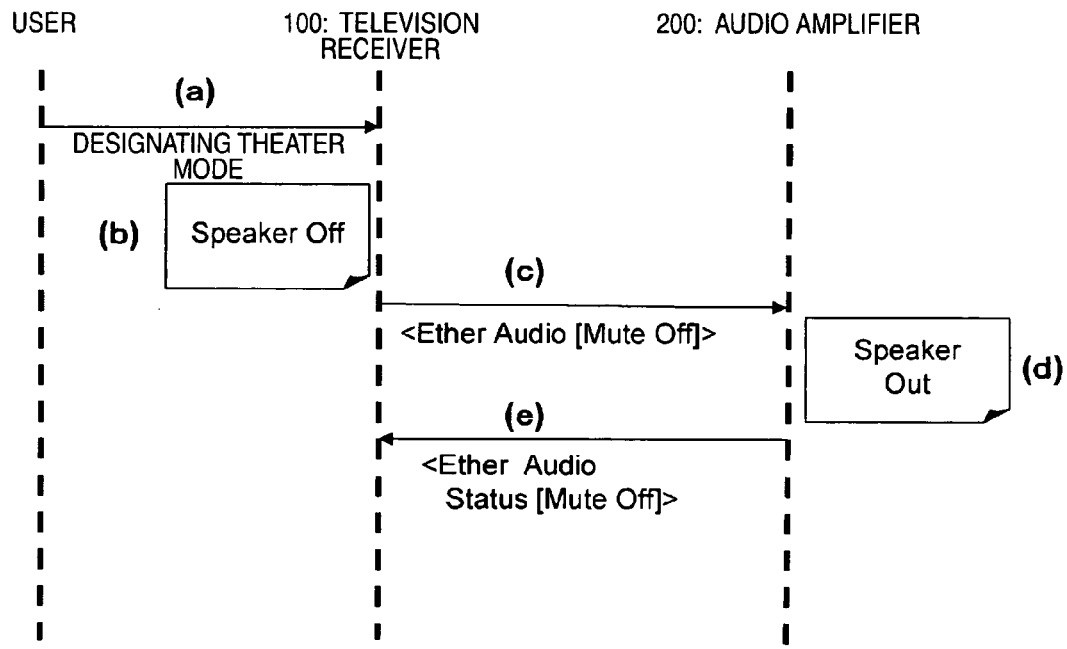
FIG. 12 is a diagram for explaining a "theater mode" sequence of switching audio outputs between the television receiver 100 and audio amplifier 200.

According to the "theater mode" sequence mentioned in FIG. 12, when a user designates the "theater mode," the audio output of the loudspeaker 115 of the television receiver 100 is muted, and an IP packet containing a muting canceling command is immediately transmitted to the audio amplifier 200 via the high-speed data line interface 103. Therefore, the state in which sounds are outputted through the loudspeaker 115 of the television receiver 100 can be immediately switched to the "theater mode" in which sounds are outputted through the loudspeaker group 500 connected to the audio amplifier 200.

Figure 13:
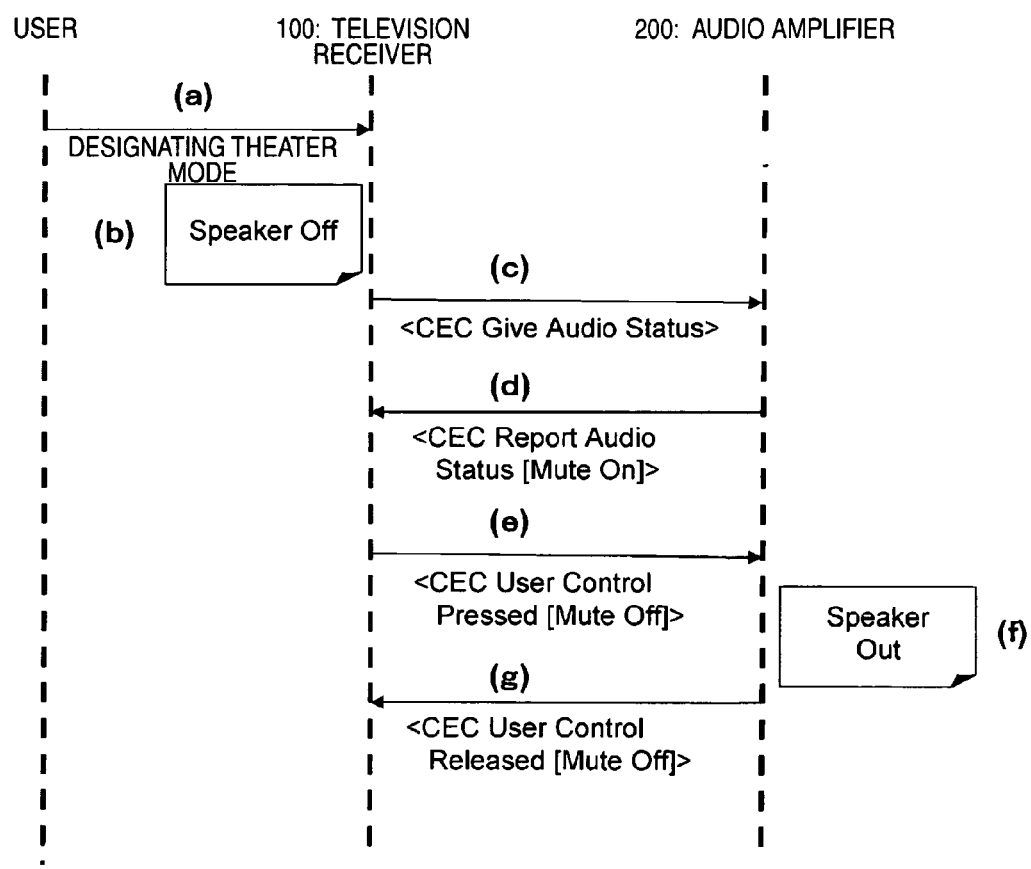
FIG. 13 is a diagram showing as a comparative example a "theater mode" sequence to be employed in a case where a high-speed data line interface is not included.

FIG. 13 shows as a comparative example the "theater mode" sequence to be employed in a case, where the pieces of equipment of the communication system 10 shown in FIG. 1 do not include the high-speed data line interface.

(a) When a user uses the remote control transmitter 127 to designate the "theater mode," (b) the CPU 121 of the television receiver 100 controls the audio amplification circuit 114 so as to mute the audio output of the loudspeaker 115. (c) The television receiver 100 inquires the audio amplifier 200 for a muting situation using the CEC line. (d) In response to the inquiry for the muting situation, the audio amplifier 200 transmits the muting situation to the television receiver 100 using the CEC line.

(e) When muting is not canceled in the audio amplifier 200, the CPU 121 of the television receiver 100 returns a CEC command, which instructs muting cancellation, to the audio amplifier 200 using the CEC line. (f) Based on the CEC command, the audio amplifier 200 controls the audio amplification circuit 208 so as to cancel muting of the audio output of the 5.1-channel loudspeaker group 500. Accordingly, the state in which sounds are outputted through the loudspeaker 115 of the television receiver 100 is switched to the "theater mode" in which sounds are outputted through the loudspeaker group 500 connected to the audio amplifier 200. If the high-speed data line interface is not included, feeding audio data from the television receiver 100 to the audio amplifier 200 is achieved over, for example, an optical cable.

(g) After canceling muting, the CPU 213 of the audio amplifier 200 transmits the result to the television receiver 100 using the CEC line.

According to the "theater mode" sequence mentioned in FIG. 13, after a user designates the "theater mode," the television receiver 100 inquires the audio amplifier 200 for a muting situation. If muting is not canceled, the television receiver 100 transmits a CEC command, which instructs muting cancellation, to the audio amplifier 200 so as to switch the state to the "theater mode." Therefore, the time that elapses until the state is actually switched to the "theater mode" after the user designates the "theater mode" gets longer. According to the "theater mode" control sequence mentioned in FIG. 13, the optical cable over which audio data is transmitted is needed in addition to the HDMI cable 610.

Figure 14:
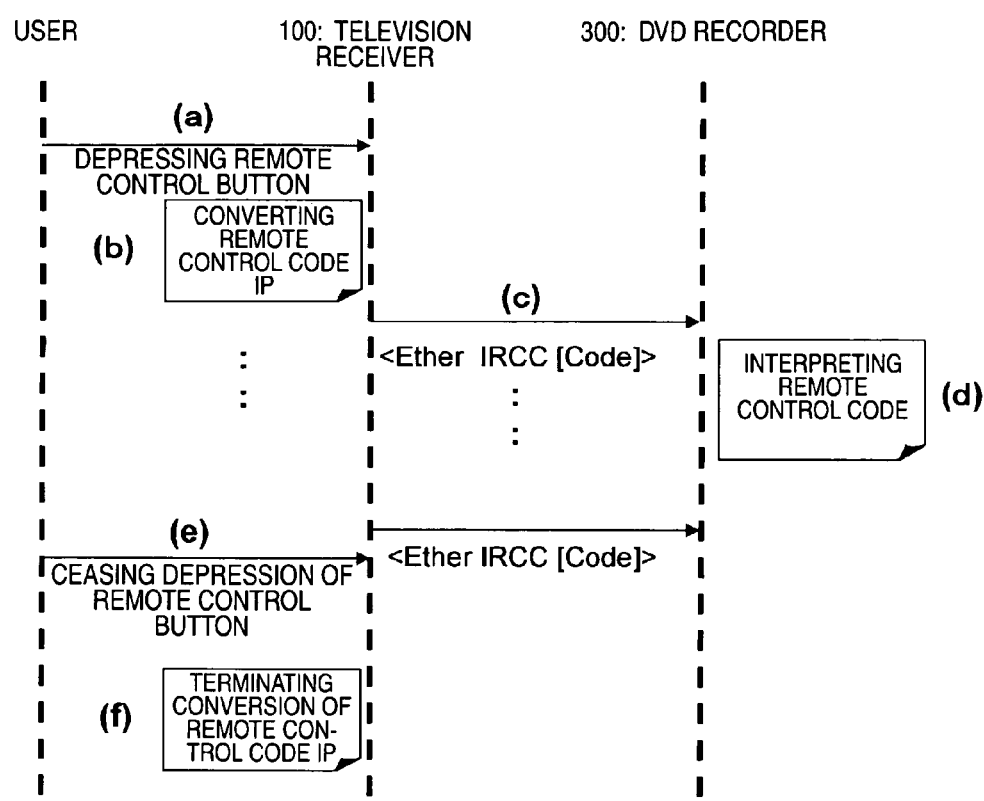
FIG. 14 is a diagram for explaining a "remote control" sequence.

Referring to the sequence diagram of FIG. 14, a "remote control" sequence will be described below. Incidentally, FIG. 14 is concerned with a case where a remote control code is transmitted from the television receiver 100 to the DVD recorder 300.

(a) While a user is depressing a predetermined button (remote control button) of the remote control transmitter 127, the CPU 121 of the television receiver 100 (b) produces an IP packet containing a remote control code received by the remote control receiving unit 126, and (c) transmits the IP packet to the DVD recorder 300 via the Ethernet interface 124 and high-speed data line interface 103.

(d) The DVD recorder 300 receives the IP packet sent from the television receiver 100 using the high-speed data line interface 303. The CPU 311 of the DVD recorder 300 interprets the remote control code contained in the IP packet and controls the relevant part of the DVD recorder 300. In this case, the CPU 311 can learn the length of the user's depression of the button from the receiving duration for the IP packet, and can interpret the remote control code in consideration of the length of the depression.

(e) When the user ceases depression of the predetermined button of the remote control transmitter 127, (f) the CPU 121 of the television receiver 100 terminates production of the IP packet containing the remote control code.

According to the "remote control" sequence mentioned in FIG. 14, the television receiver 100 produces an IP packet containing a remote control code, transmits the IP packet to the DVD recorder 300 via the high-speed data line interface 103, and controls the actions in the DVD recorder 300. Therefore, in the television receiver 100, the processing of converting the remote control code into, for example, a code defined under the CEC becomes unnecessary. Likewise, in the DVD recorder 300, the processing of converting the code defined under the CEC into the original remote control code becomes unnecessary. The pieces of processing on the transmitting and receiving sides respectively of the remote control code are simplified. The television receiver 100 transmits an IP packet containing the remote control code to the DVD recorder 300 via the high-speed data line interface 103. Remote control of the DVD recorder 300 from the television receiver 100 side can be quickly achieved.

Figure 15:
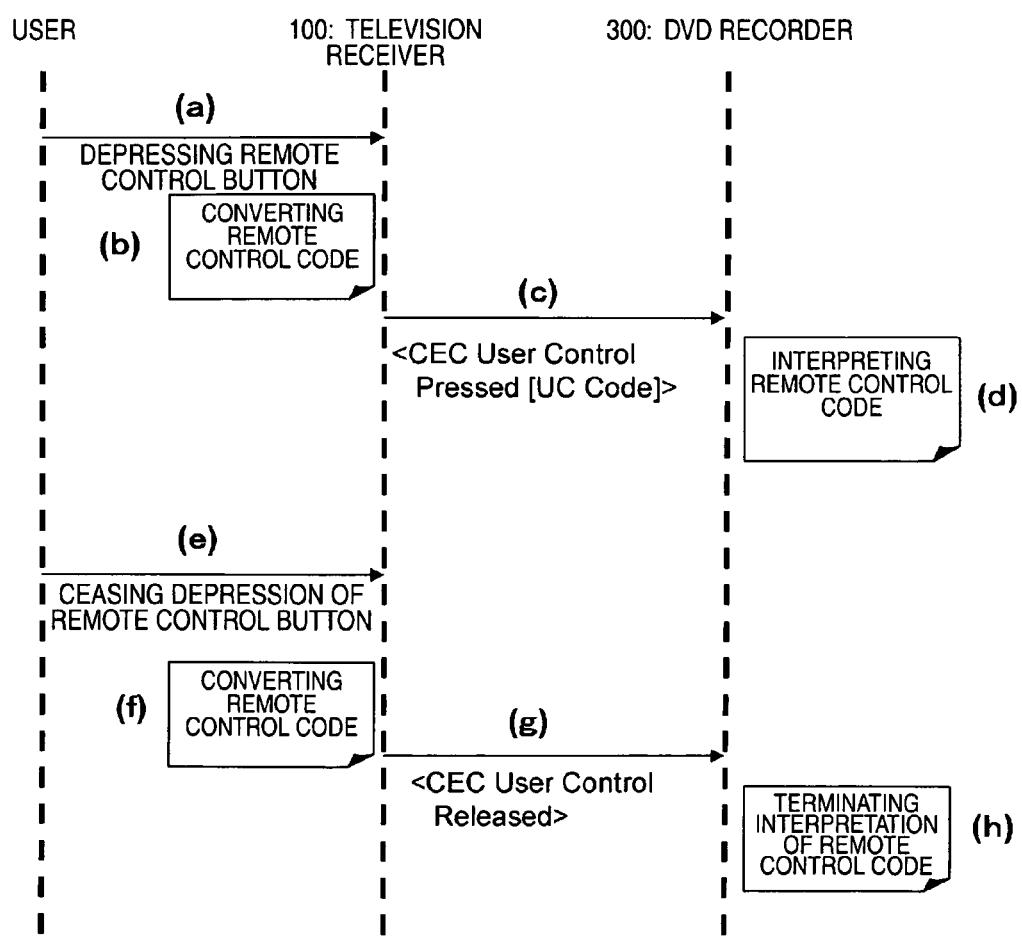
FIG. 15 is a diagram showing as a comparative example a "remote control" sequence to be employed in a case where a high-speed data line interface is not included.

FIG. 15 shows as a comparative example a "remote control" sequence to be employed in a case where the pieces of equipment of the communication system 10 shown in FIG. 1 do not include the high-speed data line interface.

(a) When a user depresses a predetermined button of the remote control transmitter 127, (b) the CPU 121 of the television receiver 100 converts a remote control code received by the remote control receiver 126 into a CEC command according to a code list defined under the CEC. (c) The CPU 121 transmits the CEC command to the DVD recorder 300 using the CEC line. (d) The CPU 311 of the DVD recorder 300 reconverts the CEC command sent from the television receiver 100 into the remote control code, interprets the remote control code, and controls the relevant part of the DVD recorder 300.

(e) Thereafter, if the user ceases depression of the predetermined button of the remote control transmitter 127, the CPU 121 of the television receiver 100 (f) produces a command defined under the CEC, and (g) transmits the CEC command to the DVD recorder 300 using the CEC line. (h) The CPU 311 of the DVD recorder 300 terminates interpretation of the remote control code on the basis of a command signifying cease of the depression of the remote control button and being sent from the television receiver 100.

According to the "remote control" sequence mentioned in FIG. 15, the television receiver 100 converts a remote control code into a CEC command according to the code list defined under the CEC, and transmits the CEC command to the DVD recorder 300. The DVD recorder 300 reconverts the sent CEC command into the remote control code and interprets the remote control code. The processing loads incurred by the transmitting and receiving sides of the remote control code are therefore increased. Since the CEC line characteristic of a low transmission speed is used to send the remote control code, if the data length of the CEC command is long, a delay may be invited to the remote control of the DVD recorder 300 from the television receiver 100 side.

As described so far, in the communication system 10 shown in FIG. 1, the bidirectional communication unit using two lines (the reserved line and HPD line) of the HDMI cable 610 or 620 is used to transmit channel selection information, a remote control code instructing recording, "theater mode" designating information, a remote control code, or the like from the television receiver 100 to the audio amplifier 200 or DVD recorder 300. The operating state of the audio amplifier 200 or DVD recorder 300 can be quickly controlled.

In the foregoing embodiment, the high-speed bidirectional communication unit using the reserved line and HPD line of the HDMI cable has been described. The high-speed bidirectional communication unit may be constructed using the other lines of the HDMI cable.

In the aforesaid embodiment, a description has been made on the assumption that the interface conformable to the HDMI standards is adopted as a transmission line between pieces of equipment. The invention can apply to any other similar transmission standards. In the aforesaid embodiment, the communication system 10 includes the television receiver 100, audio amplifier 200, and DVD recorder 300. The invention can apply to a similar communication system including the other pieces of equipment.

In the aforesaid embodiment, bidirectional IP communication is performed between pieces of equipment. Bidirectional communication can be performed under any protocol other than the IP. In the aforesaid embodiment, the pieces of equipment are interconnected over the HDMI cable. The invention can also apply to a case where the pieces of equipment are interconnected by radio.

INDUSTRIAL APPLICABILITY

The invention permits quick control of the operating state of source equipment side from sink equipment, and can apply to a communication system having multiple pieces of equipment HDMI-interconnected.

The invention claimed is:

1. Electronic equipment including a signal receiving unit that receives a video signal, which is sent over a transmission medium by means of differential signals on a plurality of channels, from another electronic equipment, characterized in that:

the electronic equipment comprises a communication unit that performs bidirectional communication using predetermined lines included in the transmission medium; and the communication unit transmits at least control information, which signifies control by a control unit of the electronic equipment to attain an operating state selected by a user in the electronic equipment and is used by another control unit of the another electronic equipment to control an operating state of the another electronic equipment to be same as the operating state selected, to the another electronic equipment, wherein the control information is transmitted immediately when a single operation is performed by the user to select the operating state in the electronic equipment.

2. The electronic equipment according to claim 1, characterized in that:

the electronic equipment comprises: a broadcast receiving unit that acquires a video signal on a predetermined channel on the basis of a television broadcast signal; a display unit that displays a picture represented by the video signal acquired by the broadcast receiving unit; and a user operating unit which the user uses to instruct recording of the video signal representing the picture displayed on the display unit; and the communication unit transmits information on channel selection in the broadcast receiving unit to the another electronic equipment and also transmits information on the recording instruction entered using the user operating unit.

3. The electronic equipment according to claim 1, characterized in that:
the electronic equipment comprises: a broadcast receiving unit that acquires a video signal and an audio signal on the basis of a television broadcast signal; a display unit that displays a picture represented by the video signal acquired by the broadcast receiving unit; a loudspeaker that outputs sounds represented by the audio signal acquired by the broadcast receiving unit; and a user operating unit which the user uses to designate an external audio output mode in which sounds represented by the audio signal acquired by the broadcast receiving unit are outputted through an external loudspeaker; and
the communication unit feeds the audio signal, which is acquired by the broadcast receiving unit, to the another electronic equipment, and transmits designating information on the external output mode entered using the user operating unit.

4. The electronic equipment according to claim 1, characterized in that:
the electronic equipment comprises a remote control signal receiving unit that receives a remote control signal sent from a transmitter of the remote control signal; and
the communication unit transmits the remote control signal received by the remote control signal receiving unit to the another electronic equipment.

5. A control information transmission method for, in electronic equipment including a signal receiving unit that receives a video signal, which is sent over a transmission medium by means of differential signals on a plurality of channels, from another electronic equipment, transmitting control information, which is used to control an operating state of the another electronic equipment side, characterized in that:
a communication unit that performs bidirectional communication using predetermined lines included in the transmission medium is included; and
the communication unit transmits the control information to the another electronic equipment, wherein the control information signifies control by a control unit of the electronic equipment to attain an operating state selected by a user in the electronic equipment and is used by another control unit of the another electronic equipment to control the operating state of the another electronic equipment to be same as the operating state selected, wherein the control information is transmitted immediately when a single operation is performed by the user to select the operating state in the electronic equipment.

6. Electronic equipment including a signal transmitting unit that transmits a video signal to another electronic equipment over a transmission medium by means of differential signals on a plurality of channels, characterized in that:
the electronic equipment comprises a communication unit that performs bidirectional communication using predetermined lines included in the transmission medium, and a control unit that controls an operating state on the basis of control information received by the communication unit, wherein the control information signifies control by another control unit of the another electronic equipment to attain an operating state selected by a user in the another electronic equipment and is used by the control unit of the electronic equipment to control an operating state of the electronic equipment to be same as the operating state selected, wherein the control information is transmitted immediately from the another electronic equipment when a single operation is performed by the user to select the operating state selected in the another electronic equipment.

7. The electronic equipment according to claim 6, characterized in that:
a broadcast receiving unit that acquires a video signal on a predetermined channel on the basis of a television broadcast signal, and a recording unit that records the video signal acquired by the broadcast receiving unit are included; and
the control unit controls a channel, which is selected by the broadcast receiving unit, on the basis of information on channel selection received by the communication unit, and also controls the recording unit on the basis of information on recording instruction, which is received by the communication unit, so that the recording unit will initiate recording of the video signal acquired by the broadcast receiving unit.

8. The electronic equipment according to claim 6, characterized in that:
the electronic equipment comprises an audio output unit that outputs an audio signal received by the communication unit to a loudspeaker; and
based on designating information on an external audio output mode received by the communication unit, the control unit implements control so that muting in the audio output unit will be changed from an on state to an off state.

9. The electronic equipment according to claim 6, characterized in that the control unit controls the actions of components on the basis of a remote control signal received by the communication unit.

10. A control information reception method for, in electronic equipment including a signal transmitting unit that transmits a video signal to another electronic equipment over a transmission medium by means of differential signals on a plurality of channels, receiving control information, which is used to control an operating state, from the another electronic equipment, characterized in that:
a communication unit that performs bidirectional communication using predetermined lines included in the transmission medium is included; and
the communication unit receives the control information from the another electronic equipment, wherein the control information signifies control by another control unit of the another electronic equipment to attain an operating state selected by a user in the another electronic equipment and is used by a control unit of the electronic equipment to control an operating state of the electronic equipment to be same as the operating state selected, wherein the control information is transmitted immediately from the another electronic equipment when a single operation is performed by the user to select the operating state selected in the another electronic equipment.

* * * * *

UNITED STATES PATENT AND TRADEMARK OFFICE
CERTIFICATE OF CORRECTION

PATENT NO. : 8,587,723 B2  
APPLICATION NO. : 12/312353  
DATED : November 19, 2013  
INVENTOR(S) : Nakajima et al.

Page 1 of 1

It is certified that error appears in the above-identified patent and that said Letters Patent is hereby corrected as shown below:

On the Title page, Item [54] and in the Specification, Column 1, Line 5, in the title,
--BIDIRECITONAL-- should read "BIDIRECTIONAL".

Signed and Sealed this  
Twenty-fourth Day of December, 2013

Margaret A. Focarino  
*Commissioner for Patents of the United States Patent and Trademark Office*